US005907348A

United States Patent [19]

Ogasawara et al.

[11] Patent Number: 5,907,348

[45] Date of Patent: May 25, 1999

[54] FUSING DEVICE USING A HEAT ACCUMULATED HEATING MEDIUM AND THE FUSING METHOD USING THE SAME

[75] Inventors: Masashi Ogasawara; Eiichi Akutsu; Tetsuro Kodera, all of Nakai-machi, Japan

[73] Assignee: Fuji Xerox Co., Ltd., Tokyo, Japan

[21] Appl. No.: 08/671,614

[22] Filed: Jun. 28, 1996

[30] Foreign Application Priority Data

| | | | |
|---|---|---|---|
| Jun. 30, 1995 | [JP] | Japan | 7-188481 |
| Jan. 12, 1996 | [JP] | Japan | 8-021809 |

[51] Int. Cl.$^{6}$ .............................. B41J 2/315; G01D 15/10

[52] U.S. Cl. .............................. 347/212

[58] Field of Search .............................. 347/212, 102, 347/17; 399/329, 328; 219/216; 430/126; 346/134

[56] References Cited

U.S. PATENT DOCUMENTS

| | | | |
|---|---|---|---|
| 4,565,439 | 1/1986 | Reynolds | 399/329 |
| 5,053,829 | 10/1991 | Field et al. | 399/329 |
| 5,068,675 | 11/1991 | Momose | 347/212 |
| 5,410,394 | 4/1995 | Wayman et al. | 399/329 |
| 5,418,105 | 5/1995 | Wayman et al. | 430/126 |
| 5,436,712 | 7/1995 | Wayman et al. | 399/328 |
| 5,450,182 | 9/1995 | Wayman et al. | 399/329 |
| 5,541,636 | 7/1996 | Ingram | 347/212 |

FOREIGN PATENT DOCUMENTS

| | | |
|---|---|---|
| A-63-313182 | 12/1988 | Japan . |
| A-2-72376 | 3/1990 | Japan . |
| A-4-362679 | 12/1992 | Japan . |
| A-4-372975 | 12/1992 | Japan . |

OTHER PUBLICATIONS

Japan Hardcopy '90 collection of articles published Jun. 20, 1990, pp. 53–56, entitled as "New Fixing System 'SURF' Can Reduce the Warm Up Time".

*Primary Examiner*—N. Le
*Assistant Examiner*—L. Anderson
*Attorney, Agent, or Firm*—Oliff & Berridge PLC

[57] ABSTRACT

The fusing device using a heat accumulated heating medium and the fusing process using the same is disclosed. The fusing device comprises a heating member having relatively low heat capacity, a heat accumulating system for temporarily accumulating heat energy at the heating member, a nip arrangement for nipping the toner image between the heating member and the copy sheet with an appropriate pressure contact so that the nip arrangement primarily transfers the heat energy from the heating member to the toner image and subsequently cools the toner image, a cooling system for cooling the toner image between the heating member and the copy sheet and a detaching system for detaching the copy sheet from the heating member. The thermal efficiency of the fusing device and process speed for the fusing operation is improved. The fusing condition for both of black color toner image and full color toner image is finely adjustable in this fusing device.

21 Claims, 33 Drawing Sheets

FUSING DEVICE USING A HEAT ACCUMULATED HEATING MEDIUM AND THE FUSING METHOD USING THE SAME

BACKGROUND OF THE INVENTION

This invention relates to a fusing device and a fusing method using a heating medium which has relatively low heat capacity.

Many reproducing devices, utilizes heat roll type fusing devices. The heat roll type fusing device comprises a heat roll and a pressure roll which form a fusing nip therebetween by pressing both rolls each other. A heating element is installed inside of the heating roll to heat a surface of the heat roll. A copy sheet is passed through the fusing nip to fix a toner image on the copy sheet. In heat roll-type fusing devices, the heat roller generally has a high heat capacity as a whole, requiring relatively long warm-up time, to heat the heat roll up to a sufficient temperature for fusing operation. In addition, high electric power is required to maintain the temperature of the heat roll surface at an appropriate temperature.

To avoid such problems, several fusing devices using a heating medium which has relatively low heat capacity are proposed.

The following disclosures about fusing devices using such heating medium may be relevant to the present invention.

JP-A 63-313182 discloses a fusing device comprising a heat-resistive film and a relatively small heating element. A copy sheet is contacted to the heat resistive film at a fusing nip. The heating element is installed at the nip portion on the backside of the heat resistive film to generate and apply heat energy to the toner image on the copy sheet in response to an input-pulsed signal. The copy sheet is detached from the heat-resistive film after the toner image is cooled and coagulated on the copy sheet. A heat-sink member may be introduced thereto during the cooling operation.

Japan Hardcopy '90, collection of articles published Jun. 20, 1990, pp. 53–56, titled as "New Fixing System 'SURF' can reduce the warm up time" discloses a fusing device comprising a thin endless belt extended among two rollers including driving roller and a heater element. A pressure roller is mounted onto one side of the endless belt at a position where the heating element is contacted thereto from the backside. A copy sheet is passed through a nip formed between the endless belt and the pressure roller. A toner image on the copy sheet receives heating energy generated by the heating element from the backside thereof.

In these fusing devices, the film or the belt is typically heated at a fusing nip where the heating element contacts to the pressure member. Generally, such a pressure member have high heat capacity sufficient to reduce the heating efficiency of the heating element. The existence of such a member at the fusing nip still increases the required electric power for the fusing device and reduces process speed of the printing machine.

To enhance heat efficiency of the fusing device, several approaches have been proposed. Several fusing devices separating heat function from the pressure function have been reported to enhance the heating efficiency and reduce the electric power usage. The following disclosures describing separated functions of heat and pressure also may be relevant to the present invention.

U.S. Pat. No. 4,565,439 discloses a low mass heat and pressure fuser characterized by the separation of the heat and pressure functions such that the heat and pressure are effected at different locations on a thin flexible belt forming the toner contacting surface. A pressure roll cooperates with a non-rotating mandrel to form a nip through which the belt and copy substrate pass simultaneously. The belt is heated such that by the time it passes through the nip its temperature together with the applied pressure is sufficient for fusing the toner images passing therethrough.

U.S. Pat. No. 5,053,829 discloses a fusing apparatus including two nip forming members which cooperate to form a nip having an asymmetrical pressure profile. The pressure profile through the nip, from entrance to exit, is such that toner images on a substrate passing through the nip are first subjected to relatively low pressure which continues until the toner begins to flow. Once, toner flow commences, the images are subjected to pressure high enough to force the toner into the substrate. The nip is readily variable for accommodating different fusing speeds for different processors.

In those references, endless belts are used as a heating medium. The surface temperature of these heating medium is raised easily by applying relatively small amount of thermal energy. Also, the accumulated heating energy of the heating medium transfers from the endless belt to the toner image immediately. However, as these fusing devices release the toner image from the fusing nip right after the thermal transfer, the fused toner image sometimes remains on the surface of the heating elements. In other words, sometimes hot offset occurs onto the heating medium. This offset problem is typically induced when the fusing device is utilized for a fusing process of multi-layered color toner image. This is due to low melt viscosity upon melting of the color toner. In a color image fusing process, it is preferred that the fused toner images, including several different color-toners, should be melted and mixed completely each other. If any interfaces between toner layers remain in the fixed toner image, the brightness of the toner image will be lost because such interfaces will diffuse incident light into the toner image. It is also preferred that the surface of the fixed color toner image should have specific surface smoothness, typically more than 50% , preferably more than 80% in glossiness defined by JIS (Japanese Industrial Standard) Z8741-75. If the surface of the fixed toner image is not smooth, the color of the fixed image will be dimmed because the incident light will be reflected irregularly at the surface of the toner image rather than incorporated into the toner image. Relating to such problems, the following disclosures about fusing devices specialized as the color toner image also may be relevant to the present invention.

JP-A 4-372975 discloses a fusing device using a thin endless loop film. The thin endless loop film passes through several nip portions such a heat applying nip, a sheet detaching nip and a pressure applying nip formed by several roller members with a copy sheet. At the pressure applying nip, pressure is applied to a toner image on the copy sheet until the toner image is cooled and fixed onto the copy sheet, in order to mix color toners well to enhance color reproduction. The amount of pressure applied to the toner image and temperature of the toner image may be controlled at the pressure applying nip. The copy sheet is detached from the thin endless film at the detaching nip after the toner image is cooled and coagulated on the copy sheet.

JP-A 2-72376 discloses a fusing device using a thin endless film. First, heat energy is applied to a toner image on a copy sheet through the thin film, and then the toner image is kept under appropriate pressure by a pressure member while the copy sheet is transported with the thin film, sticking together until the toner image is cooled to a temperature below the softening point of the toner image. Then, the copy sheet is detached from the thin film. This operation controls surface smoothness of the fused toner image so that the image will have an appropriate surface glossiness.

JP-A 4-362679 discloses a belt-type fusing device comprising an endless belt, plural rollers on which the belt is extended, a fusing nip for applying a heat energy to a toner image on a copy sheet and a cooling roller removably mounted to a back surface of the endless belt. The amount of the contact area between the cooling roller and the backside of the belt is controlled in response to a requirement of surface glossiness of final toner image on the copy sheet. Finally, the copy sheet is detached from the surface of the endless belt after the cooling treatment.

U.S. Pat. No. 5,450,182 discloses a specific kind of belt fuser for fusing toner images on a transparency material. The toner images formed on the transparency during the imaging process have time to cool prior to separation from a smooth-surfaced belt. The peak fusing temperature is significantly higher than that used with conventional fusers such as heat and pressure roll fusers. This higher temperature guarantees excellent toner melting and flow thereby producing transparencies with excellent projection efficiency. The belt fuser is comprised of separated electrical sources and electrically resistive polyimide film.

However, in these fusing device, heating energy is still provided at the fusing nips, and relatively high fusing energy is still required to these fusing apparatus. Additionally, a relatively long cooling off time just after the fusing nip is required to the fusing device to avoid offset of the toner image. This relatively longer cooling off time contributes to slow process speed of the image reproducing apparatus.

The references cited herein are incorporated by reference for their teachings.

SUMMARY OF THE INVENTION

The present invention provides a fusing device for fixing a toner image onto a copy sheet which comprises a heating member having relatively low heat capacity, a heat accumulating system for temporarily accumulating heat energy at the heating member, a nip arrangement for nipping the toner image between the heating member and the copy sheet with an appropriate pressure contact so that the nip arrangement primarily transfers the heat energy from the heating member to the toner image and subsequently cools the toner image, a cooling system for cooling the toner image between the heating member and the copy sheet and a detaching system for detaching the copy sheet from the heating member.

The present invention also provides a fixing method for fixing a toner image onto a copy sheet which comprises several steps for accumulating heat energy temporarily at a heating member, for nipping the toner image between the heating element and the copy sheet with an appropriate pressure to primarily transfer heat energy from the heating member to the toner image, and to cool the toner image thereafter, for cooling the toner image between the heating element and the copy sheet and for detaching the copy sheet from the heating member.

DESCRIPTION OF THE PREFERRED EMBODIMENT

Figure 1A:
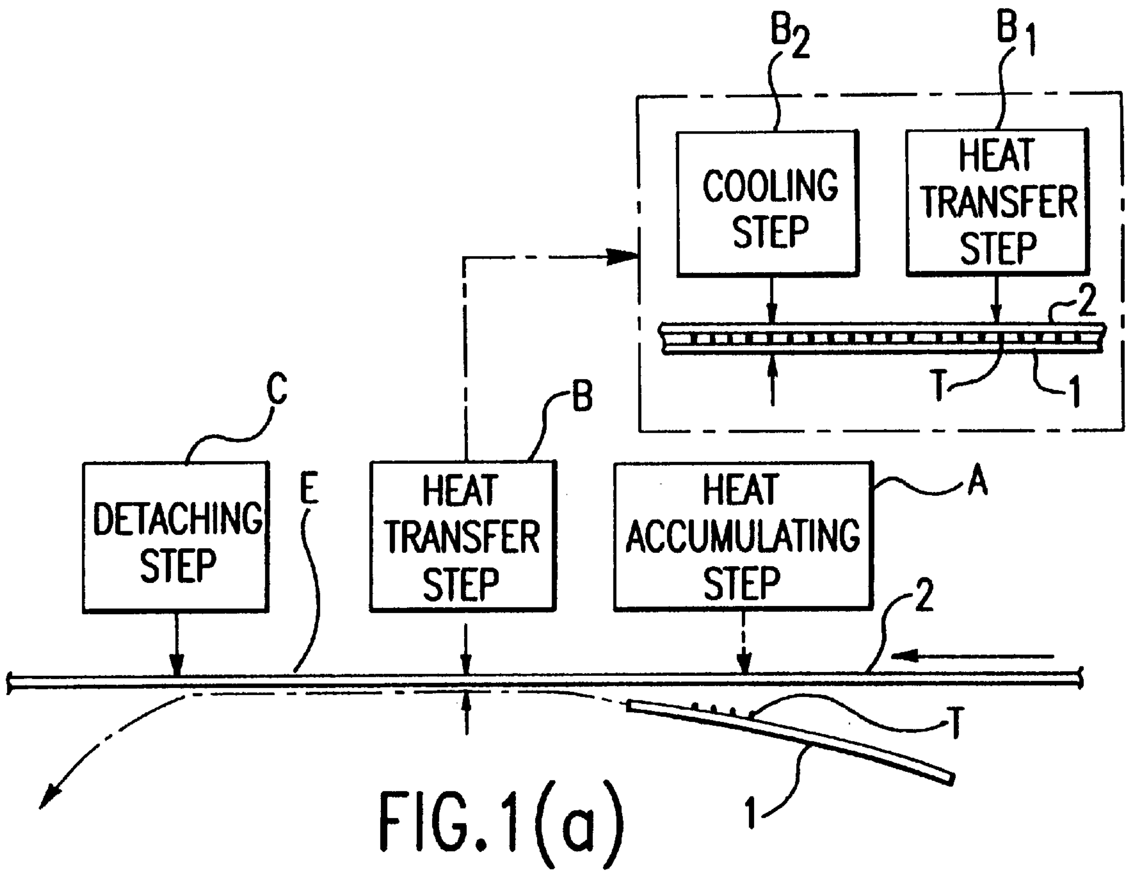
FIGS. 1(*a*) and (*b*) are both schematic view of the fusing process of the present invention.
Figure 1B:
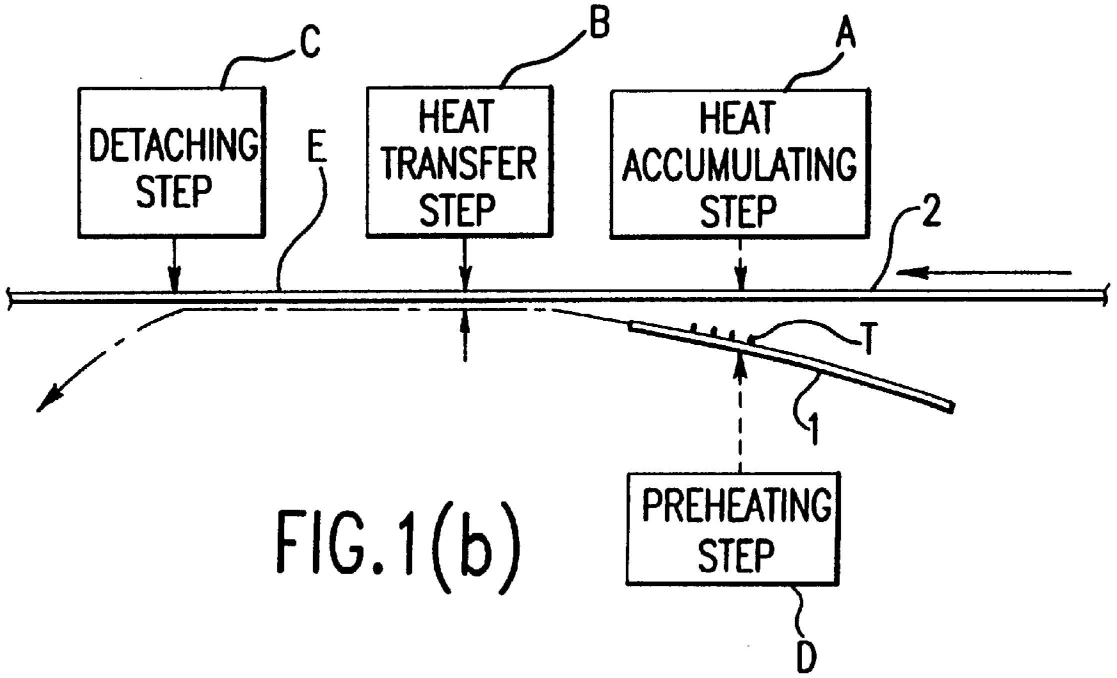

Referring now to the drawing which are for the purpose of illustrating the invention and not limiting same, in the fusing operation of the present invention as indicated in FIGS. 1(*a*) (*b*), primarily, heating energy is temporarily accumulated onto the heating medium 2 at the heat accumulating step A. Then, the heating medium 2 is moved into the heat transfer step B. The heat transfer step B includes a nip system for nipping the toner image T between the heating medium 2 and the copy sheet 1 in an appropriate pressure so as to primarily transfer accumulated heat energy onto toner image T from heating medium 2, and cool toner image T. Then toner image T between heating medium 2 and copy sheet 1 is moved into cooling step E so as to cool toner image T. Finally, heating medium 2 is moved into detaching step C accompanied with toner image T on copy sheet 1 so as to strip copy sheet 1 from heating medium 2. Preheating step D for accumulating heat energy preliminarily on toner image T may be adopted to the fusing operation of the present invention as specifically disclosed in FIG. 1(*b*). In these fusing operation, toner image T is preferably heated above its melting point at heat transfer step B. The heating energy accumulated at heating medium 2 during heat accumulating step A is preferably equal to or greater than a energy capable to heat toner image T up to its melting point at heat transfer step B. Otherwise, the total heat energy accumulated to both heating medium 2 at heat accumulating step A and toner image T at preheating step D is preferably equal to or greater than a energy capable to heat the toner image up to its melting point.

To enhance the heat efficiency of the fusing device, as indicated in FIG. 1(*a*), heat transfer step B may be functionally divided into two steps which comprises the heat transferring step B1 and the cooling step B2. The specific embodiments realizing the fusing process of FIGS. 1(*a*) and (*b*) are disclosed as the fusing devices in FIGS. 2(*a*) and (*b*) respectively. In these fusing devices, heat accumulating step A is performed by the heat accumulating means 4 which comprises the heating element 8 directly contacting heating medium 2 and heat insulating member 9, which is located on the opposite surface of heating medium 2 with respect to the heating element 8. The heat transfer step B is performed by a pair of pressure rollers 5 where the heating medium and the copy sheet is nipped therebetween. The detaching step C is performed by the detach member 6. In this case, the copy sheet is detached from the surface of the heating medium 2 by small curvature of the detaching member (roller) 6. However, the detaching step may be performed by any other detach member, such as a stripping finger or the like. Between pressure rollers 5 and detaching member 6, cooling step E is formed. The numeral 3 indicates a paper transporting system for transporting the copy sheet. The preheating device to perform the preheating step D is shown in FIG. 2(*b*).

Figure 2A:
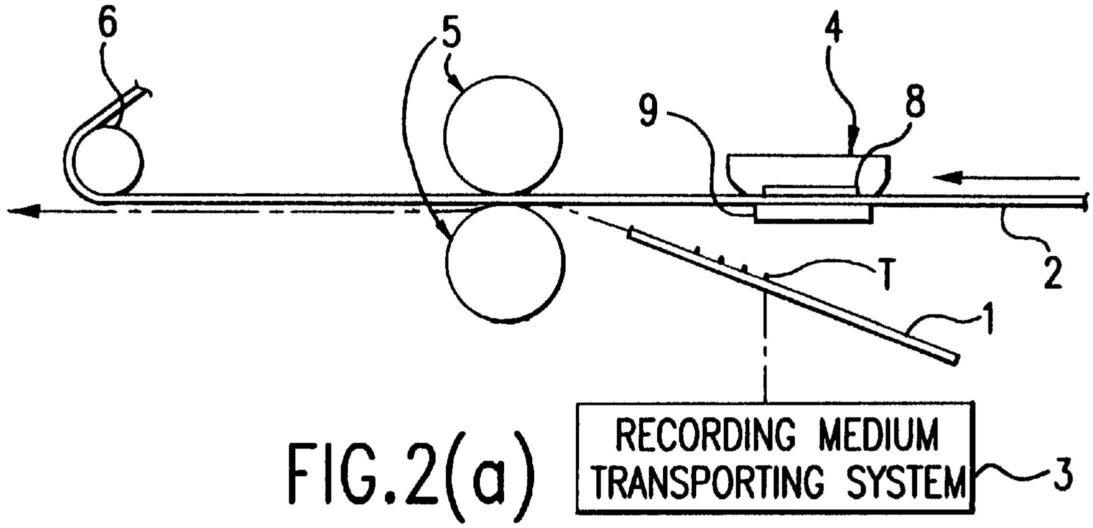
FIGS. 2(*a*) and (*b*) are both schematic view of the fusing device of the present invention.
Figure 2B:
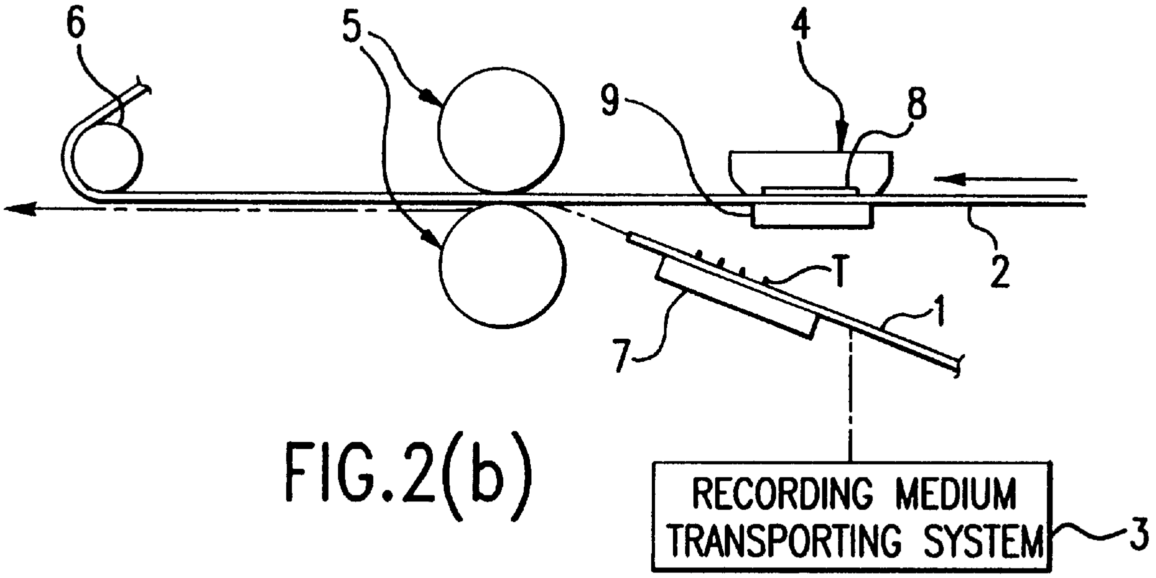
Figure 40:
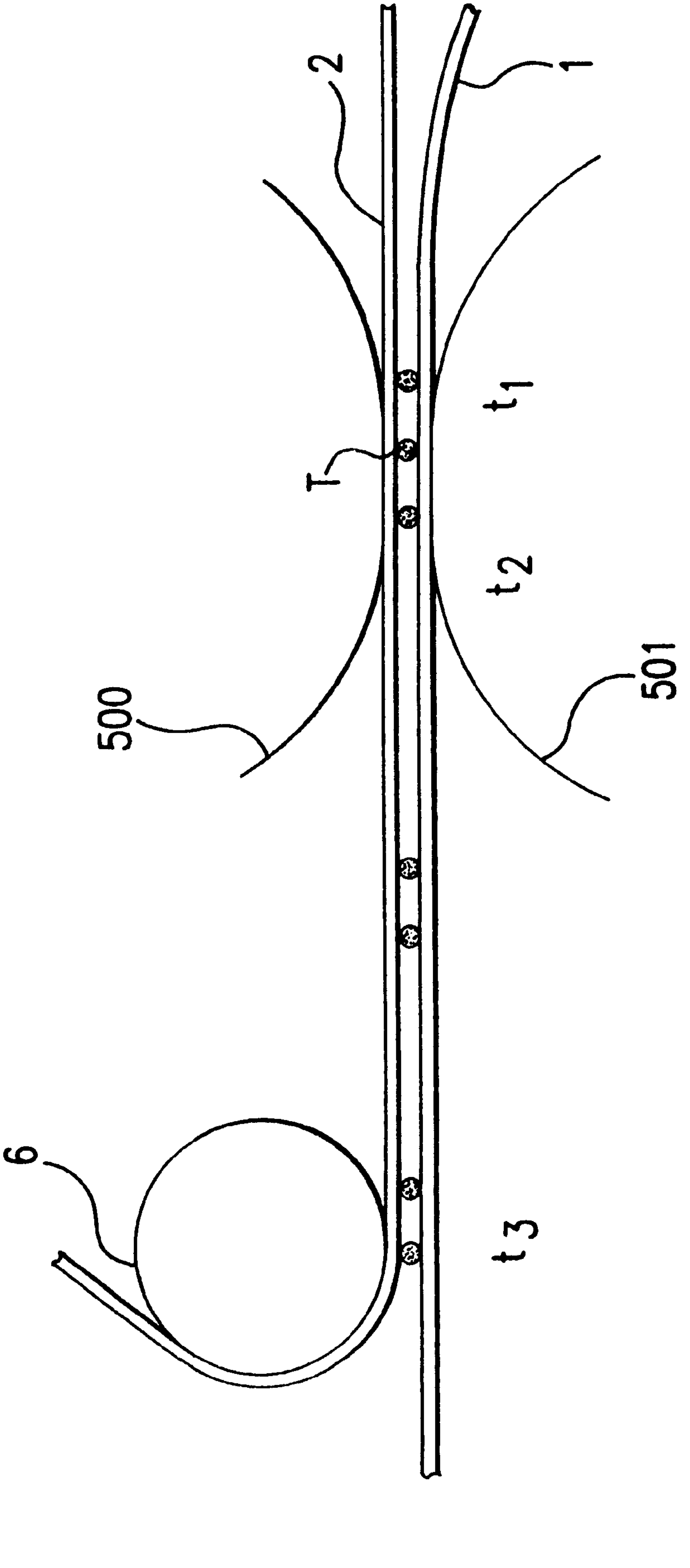
FIG. 40 is a portionally enlarged view of the fusing device defined as FIG. 2(*a*).
Figure 41:
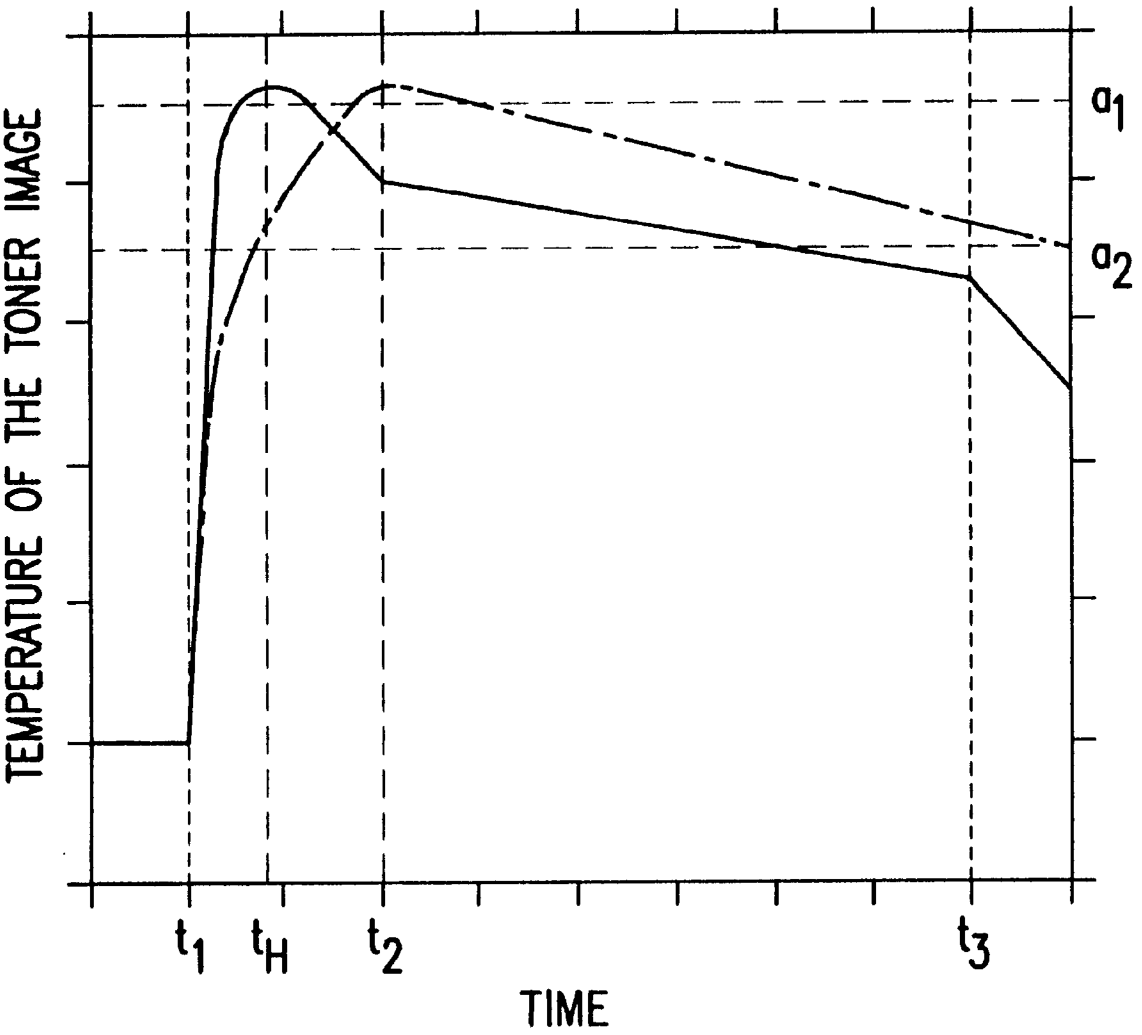
FIG. 41 is a graph showing the relationship between the temperature of the toner image and the timing of the fusing process of the present invention and conventional fusing device.

FIG. 41 indicates temperature variation of the toner image T during a fusing process using the fusing device defined in FIG. 2(*a*). FIG. 40 is the partially enlarged figure of the fusing device of FIG. 2(*a*). In FIG. 41, the vertical axis indicates temperature of the toner image, a1 indicates a melting point of the toner material and a2 indicates a maximum temperature enabling the detaching of the copy sheet from the heating medium 2 with no hot offset value, a2 is referred to as "non-offset maximum temperature" hereinafter. The horizontal axis indicates the timing of the fusing process. Time t1 is the timing of the entry of the toner image T to the nip between pressure rollers 500 and 501, and t2 is the timing of the exit of toner image T from the nip. Time t3 is the time that the toner image T is detached from the fusing belt. The solid line indicates the temperature variation profile of the toner image T in the inventive fusing device. In nip area, between t1 and t2, the toner image receives thermal energy from the fusing belt at the timing between t1 and tM. At this time, the accumulated thermal energy of heating medium 2 is rapidly transferred to the toner image T as soon as the heating medium 2 contacts toner image T, because the heating medium has relatively a low heat capacity compare to conventional heat rollers. During the heat transferring step, the temperature of the toner image T exceeds the melting point of the toner material once. Then, the toner image T is cooled down immediately after the thermal transfer is finished (after timing tM). The timing tM is defined as the timing that the heating medium 2 has transferred the whole accumulated thermal energy to the toner image T. This cooling step is ensured by the existing of a pressure rollers 500 and 501, especially roller 500 which contacts to the heating medium directly at the opposite side of the toner image T. The roller 500 is not coupled to any thermal energy source. In terms of heat transfer, the upper pressure roller 500 functions as a heat-sink rather than the heat applying source. Thus, the temperature of toner image T drastically decreases between the timing tM and t2. However, the temperature of the toner image T is not sufficiently cooled to be a temperature below the maximum non-offset temperature a2.

The temperature of the toner image T after release from the fusing nip decreases gradually from a temperature between a1 and a2 to a temperature below a2 during the time between t2 to t3. At the time t3, where the temperature of the toner image decreases to a temperature lower than a2, the copy sheet 1 holding the toner image T is detached from the heating medium 2. Thus, the offset during the fusing process is avoided.

On the other hand, the dotted line in FIG. 41 indicates the temperature variation of the toner image during a fusing operation using a conventional fusing device such as heat-roll type fusing device. In this case, the temperature of the toner image increases gradually at the fusing nip (between t1 and t2). This is because the heat energy is applied at the fusing nip and the heat rollers have relatively high heat capacity. Then, the temperature decreases gradually after the toner image is released from the fusing nip. The temperature of the toner image reaches to the highest point when the toner image is just released from the fusing nip, at t2.

In accordance with the inventions, the significant difference of the temperature variation profiles between the present invention and the prior art is the existence of a cooling process just after the heat transfer process, at the fusing nip portion. This cooling process ensure the drastic cooling of the toner image as indicated in FIG. 41. This cooling process also shortens the natural cooling time after passing the fusing nip. In other word, the speeding up of the fusing process is possible due to the significant temperature decrease at the fusing nip.

In addition, in a conventional heat-roll type fusing device, the heated toner image is released from the heat roller when the toner image is in a melting state. This means that the toner image is easily offset onto the surface of the heat roller due to its low viscosity at the melting state. In the melting state, the internal coagulating force of the toner is weaker than adhering force between the surface of the fusing roller and the toner material. Therefore, significant amounts of releasing agent are required to release the toner image from the heat roller without any offset. To avoid such a situation, it is proposed that the toner image should be released after the cooling down of the toner image. This proposal might be defined by the dotted line after the timing t3. However, in this case, the cooling of the toner image to a temperature below a2 requires much longer cooling time compared to the cooling time of the present invention after the fusing nip as indicated in FIG. 41. This will also decrease the process speed of the image reproducing device.

Generally, black-colored toner has lower viscosity compared to colored toner when heated to the melting point of the toner material. Therefore the offset problem happens less frequently in the conventional heat roll fusing apparatus. Therefore a small amount of releasing agent can be applied to the surface of the fusing roller to avoid offset problem at the fusing operations with black-colored toner. However, colored toner is especially designed to provide low viscosity above the melting point of the toner material. This is because color toner layers must be mixed well with each other to provide the appropriate mixed color when the heating energy is applied thereto, and must conform to the surface smoothness of the heat roller to provide a relatively high gloss surface to ensure the transmission of the incident light. Thus, color toner generally has high melt viscosity compare to the black-colored toner at the melting point. In the present invention, the toner image at the time t2 still have high viscosity to induce hot offset onto the surface of the fusing belt. Therefore the succeeding cooling process defined by between t2 and t3 is necessary to avoid the offset onto the heating belt, especially when colored toner is used. By using a release agent, the value of a2, the non-offset maximum temperature, might be moved upwardly in the FIG. 41 to reduce the cooling time. In this invention, with an appropriate surface of the heating medium and an appropriate colored toner material, offset-free detaching operation will be achieved without any releasing agent.

Referring back to FIGS. 2(*a*), (*b*), in terms of efficient heat accumulation to the heating medium, contacting of unnecessary heat capacitors, such as pressure roller, to the heating medium at the heat accumulating step A is preferably avoided. However, in order to enhance the heat accumulating efficiency, heat insulating material 9 may be contact to the back surface of the heating medium 2.

If necessary, the radiated thermal energy from the heat accumulating step A may be used as one heat source of the preheating step D. This feature is specifically disclosed in FIG. 3. In this feature, the copy sheet 1 is arranged just adjacent to the heating medium 2 during the heat accumulating step A. The heating accumulating means 4 includes the heating element 8 of the preheating step D as well as the heating element 8 for the heat accumulating step A. During the heat transferring step B, an appropriate pressure required to fix the toner image onto the paper is surely applied.

Figure 3:
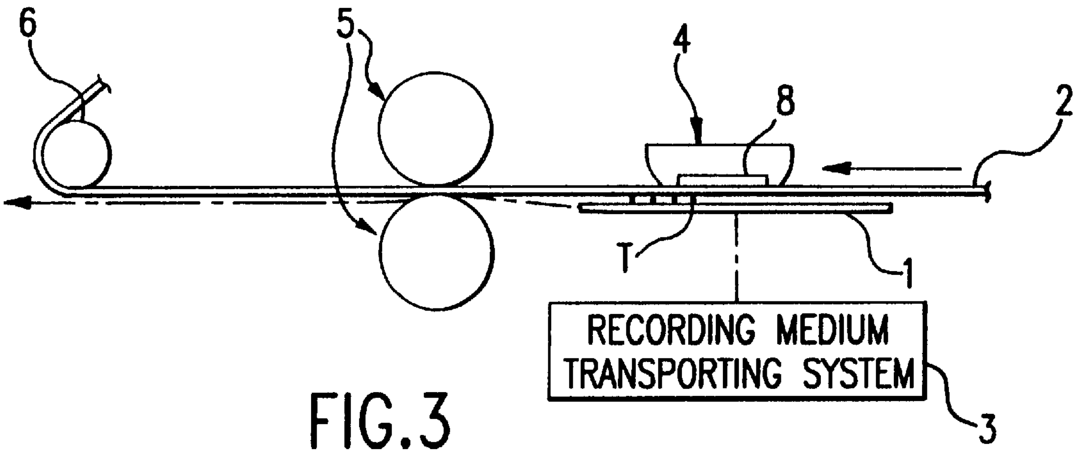
FIG. 3 is a specific representation of the fusing device represented by FIG. 2 (*a*).
Figure 4:
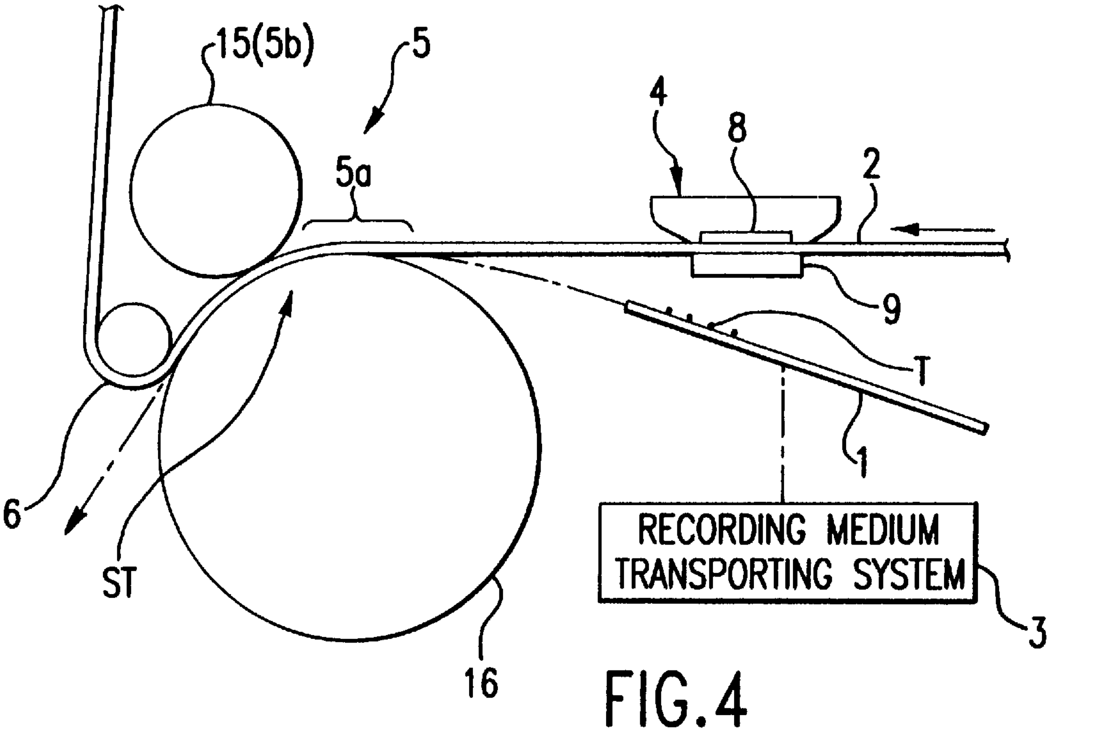
FIG. 4 is another specific representation of the fusing device represented by FIG. 2(*a*).
Figure 5A:
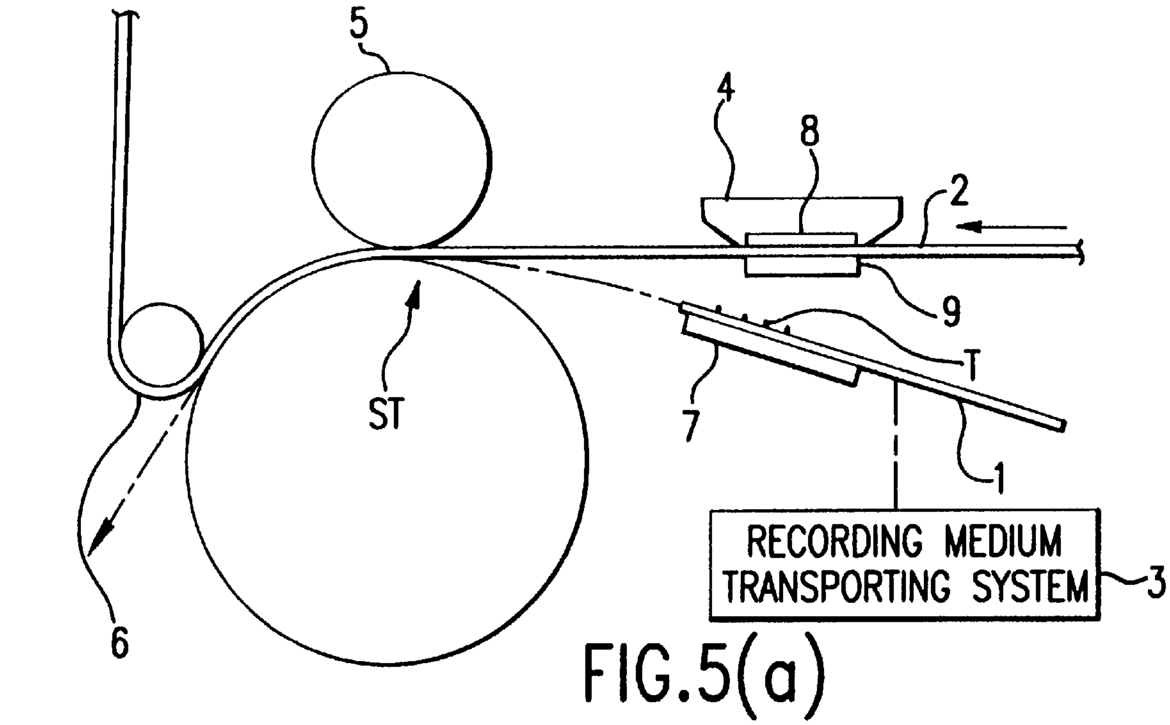
FIGS. 5(*a*) and (*b*) are both different kind of specific representation of the fusing device represented by FIG. 2(*b*).
Figure 5B:
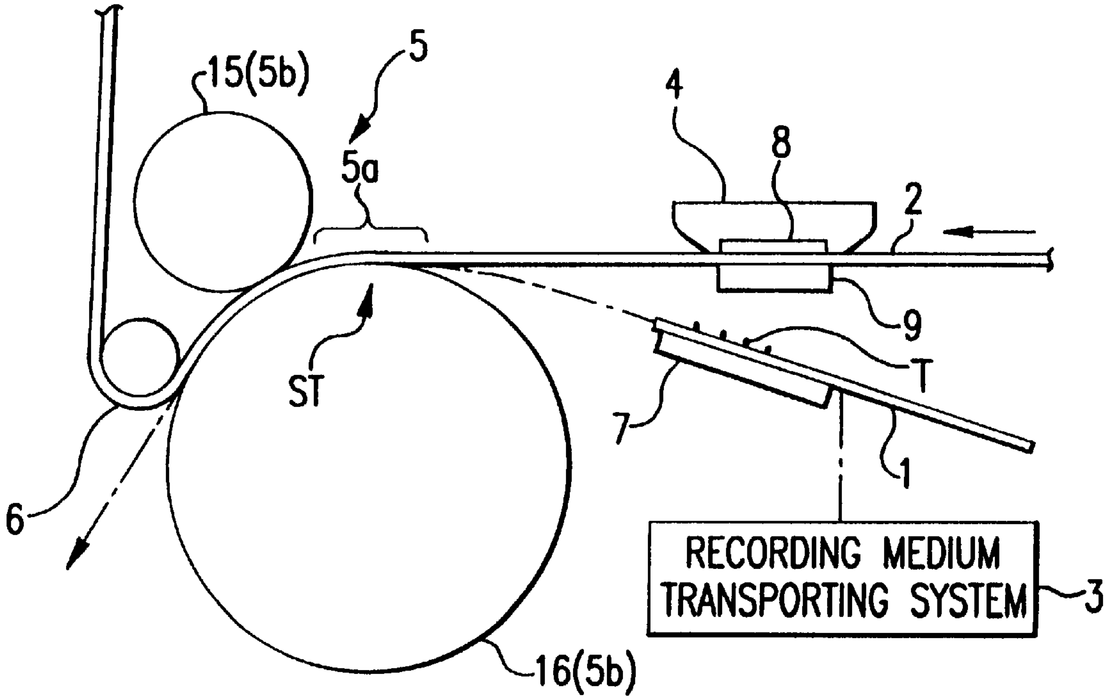

The pressure rollers 5 are typically a pair of rollers which provide one nip in cooperate with the heating medium 2 as disclosed in FIG. 3, however, the pressure rollers may be actively configured so as to separate heat transferring function from the cooling off function as disclosed in FIG. 4. In this feature, the pressure roller 15, the backup roller 16 and the heating medium 2 constitutes two separated nip portions. The first nip portion is formed between the heating medium 2 and the backup roller 16. The second nip portion is formed between the pressure roller 15 and the backup roller 16 with the heating medium 2 therebetween. If the preheating step D is utilized to the fusing device, the fusing device is constituted as FIGS. 5(*a*) and (*b*).

By this feature, the heat transferring function and the cooling off function of the nip is ideally separated as disclosed as B1 and B2 in FIG. 1(*a*). Because there are no heat sink or storage, except for air, at the back surface of the heating medium 2 at the first nip portion, the energy loss of the heat energy at the first nip portion will be almost neglected. In addition the heating loss through the copy sheet 1 would also be neglected because the copy sheet is a good heat insulating material. Therefore almost all of the accumulated heat energy will be transferred onto the toner image at the first nip portion. Then the toner image is cooled off at the second nip portion receiving an appropriate fixing pressure.

Figure 6:
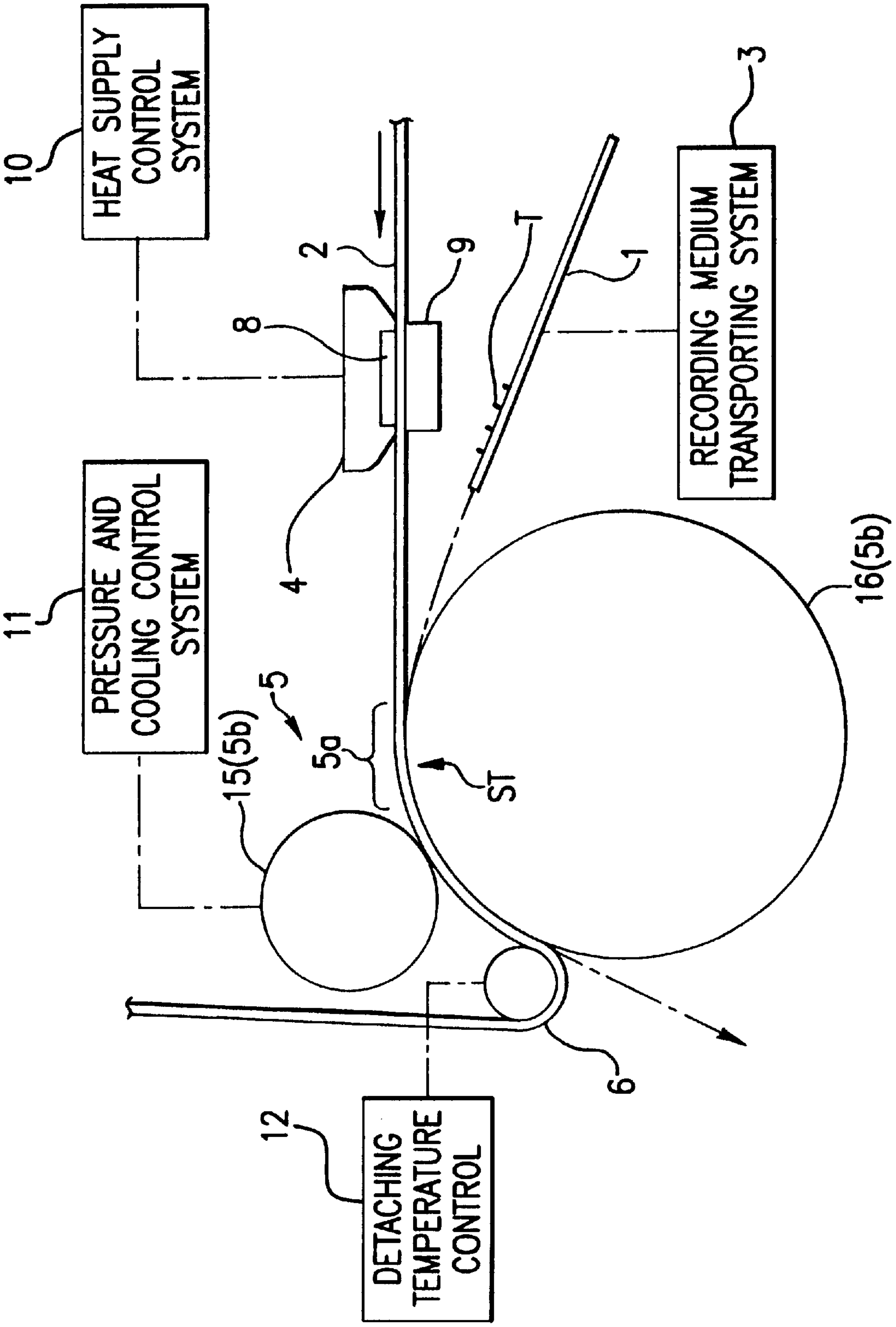
FIG. 6 is still another specific representation of the fusing device represented by FIG. 2(*a*).
Figure 7:
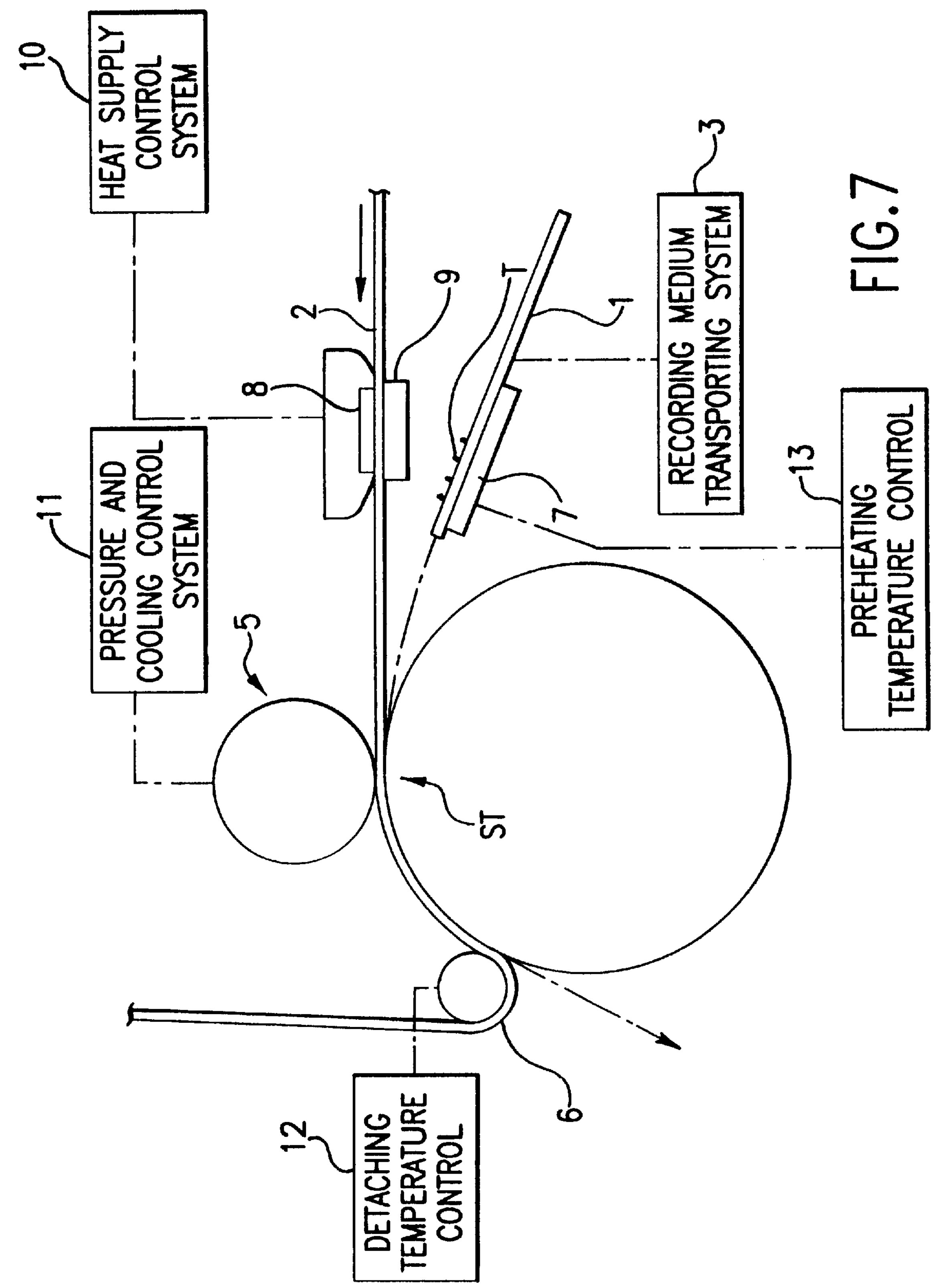
FIG. 7 is yet another specific representation of the fusing device represented by FIG. 2(*b*).

Other practical embodiments of the fusing device utilizing the innovative fusing process are disclosed at FIGS. 6 and 7 respectively. In this feature, in addition to the feature of the fusing device disclosed in the FIG. 4, FIGS. 5(*a*), (*b*), several control systems are installed.

Numeral 10 indicates a control system for controlling an amount of heat energy to be supplied to heating medium 2 in response to such selected conditions as required surface glossiness of the final toner image or environmental humidity. However, preferably, the control system is controlled so that the total heat energy is set to a relatively low when the toner image has a single color and set to relatively high when the toner image has plural different colors.

Numeral 11 indicates an another control system for controlling the amount of the nip pressure and the cooling condition of the toner image. Depending the requirement for the final image quality, these conditions might be varied. However, the control system is controlled so that the pressure is set relatively low when the toner image has a single color and set relatively high when the toner image plural different colors.

Numeral 13 indicates still another control system for controlling the preheating temperature of the toner image. This is also controlled to vary depending on several requirement for final image quality. However, it may be controlled so that the preheating temperature is set relatively low when the toner image has a single color and set relatively high when the toner image has plural different colors.

Numeral 12 indicates yet still another controlling system for controlling the temperature condition of the detaching system for controlling the final quality of the fixed toner image.

Pressure rollers 5, 15 and back up roller 16 may be formed as hard-surface rollers. However, if the fusing device is utilized as the fusing device of the full color image reproducing machine, preferably these rollers are formed as soft-surface roller. These soft rollers are obtained by lining a soft rubber such as fluoro-rubber or silicone rubber onto the surface of the hard roller. Generally, stiff surface rollers can not absorb level differences or surface unevenness of the multi-color toner or the copy sheet. Also soft surfaces ensure uniform thermal transfer, which melts the toner material well, from the roller to the toner image by covering the entire toner pile height.

Preheating step D ensures the uniform heat transmission to the layered color toner image. Heat accumulating step A and the preheating step D enable close or accurate control of the amount of heating energy for both the bottom side of the toner layer and the upper side of the toner layer independently. Thus, the fusing device of the present invention may be used as a fusing device for a full color image reproducing machine.

However, for the black-color toner image reproduction such as business documents, generally, matte image surfaces, typically with less than 10 percent glossiness, are required. If the image has a high gloss surface, readability of the image will be significantly reduced. Thus, surface glossiness is controlled by the present invention depending on the required final toner image.

Generally, for heating medium 2, a heat resistive endless film or thin hollow cylinder are preferably used. If a heat resistive endless belt is used, the endless belt preferably has a metal supporting layer. The metal supporting layer ensures mechanical strength especially at the edge portions thereof, which tends to be damaged easily during transportation of the rollers. Compared to resin films such as polyimide film, deviation of the film position among the plural rollers may be easily controlled by adding a transport guide member at the ends of rollers. Also the metal layer enhances the efficiency of heat transmission of the heating medium. For heating element 8 or preheating element 7, line heating or plane heating devices such as a ceramic heater may be preferably used. The heat radiating type heater such as halogen lamp or infrared heater may also be used.

EXAMPLE

Embodiment 1

Figure 8:
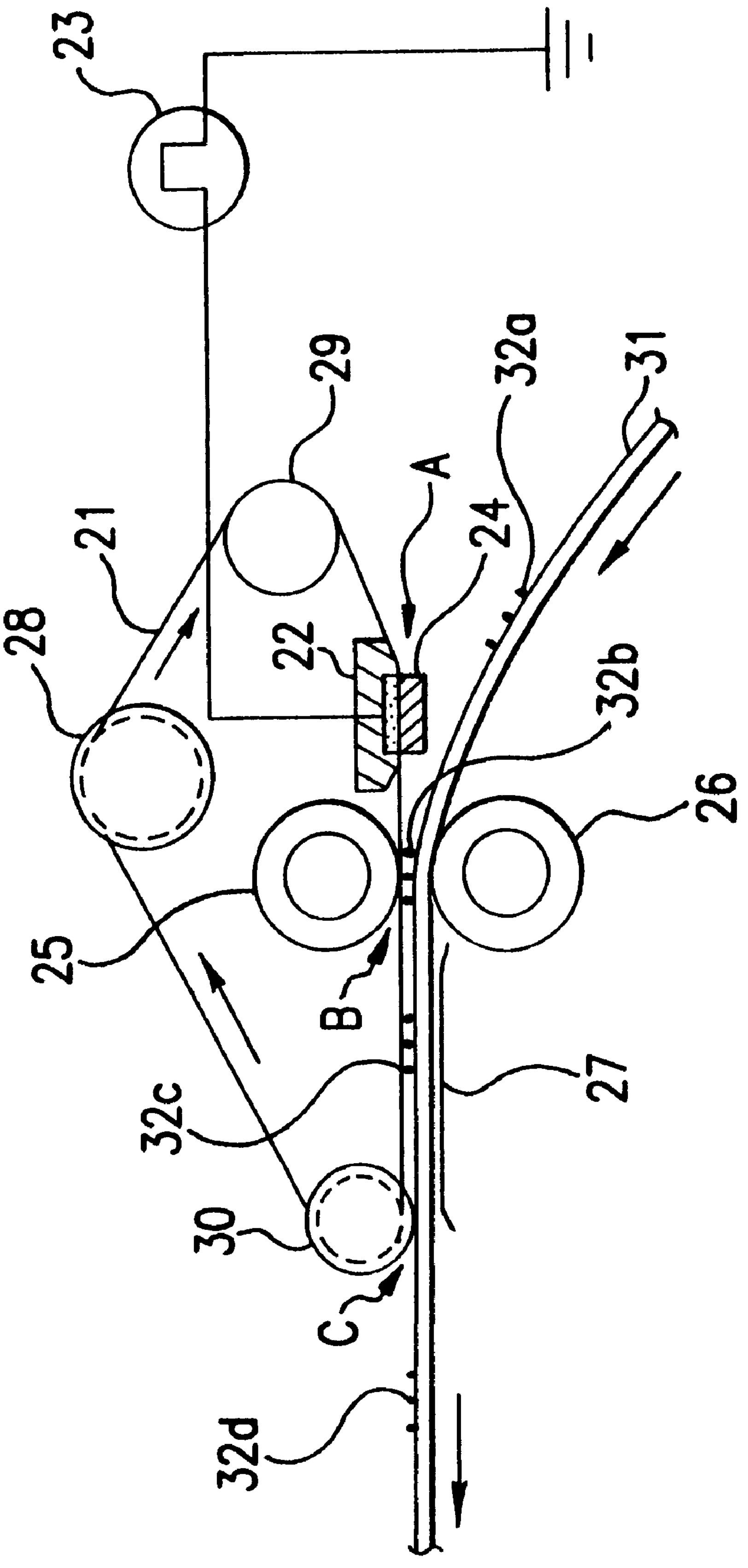
FIG. 8 is a schematic view of the first embodiment of the present invention.
Figure 9:
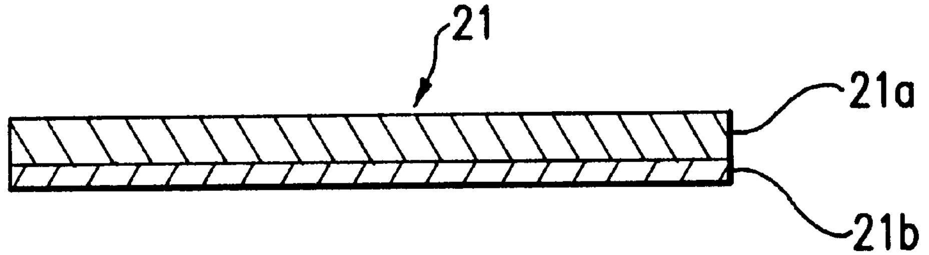
FIG. 9 is a cross-sectional view of the fusing film used in the first embodiment of the present invention.

FIG. 8 indicates the first embodiment of the fusing device of the present invention utilized for color image reproducing machine. The numeral 21 indicates a endless fusing film as the heating medium for heating toner image formed on the copy sheet 31, the numeral 22 indicates the heating element for accumulating heating energy to the fusing film 21. The numeral 23 indicates a control circuit for controlling applied voltage to the heating element 22. The numeral 24 indicates a heat insulating member for reducing heating loss from the heating element 22, the numerals 25 and 26 indicate a pressure roller and a backup roller respectively for jointly applying pressure to the fusing film 21 and the copy sheet 31, the numeral 27 indicates a guide member for guiding the copy sheet 31 and the fusing film 21 to for guiding the transporting direction of the copy sheet 31, the numeral 28 indicates a driving roller for driving the fusing film 21, the numeral 29 indicates a tension roller for applying an appropriate tension to the fusing film 21 so as not to be loosen therewith and the 30 indicates a detaching roller for detaching the copy sheet from the fusing film 21 after the fusing process.

The fusing film 21 is constituted from a supporting member 21*a*, which will be contacted to the heating element 22, and a releasing layer 21*b* formed thereon. As the supporting member 21*a*, materials having good heat resistivity, durability and mechanical strength, for example, a metal sheet such as nickel, aluminum, copper and stainless steel or a polymer film such as polyimide, polyalamide, polyamideimide, polyester, polyetheretherketone (PEEK) and polytetrafluoroethylene (PTFE) are preferably used. As the releasing layer 21*b*, materials having low surface energy and good heat resistivity, for example, a polymer materials such as silicone resin or fluoro resin or a rubber materials such as silicone rubber or fluoro rubber are preferably used.

When metal materials are used as the supporting member 21*a*, the supporting member generally has form 1 to 100 $\mu$m thickness, preferably from 10 to 50 $\mu$m thickness in terms of reproductivity, low thermal capacity and flexibility. When the polymer materials are used as the supporting member 21*a*, the supporting member generally has from 1 to 150 $\mu$m thickness, preferably from 10 to 100 $\mu$m thickness in terms of mechanical strength and low heat capacity. The releasing layer 21*b* generally has from 0.1 to 500 $\mu$m thickness, preferably from 1 to 50 $\mu$m thickness in terms of mechanical strength and low heat capacity, and not more than 30 mN/m surface energy and not less than 150° C. of heat resistivity. The fusing film 21 may be single layer structure if the film has sufficient heat resistivity, durability, mechanical strength and low surface energy. In this embodiment, the fusing film 21 is constituted from a nickel endless belt as the supporting member 21*a* which has 20 $\mu$m thickness, 310 mm width and 311 mm length (99 mm diameter) and preferably prepared by an electroforming method, and a releasing layer 21*b* which is a perfluoroalcoxy (PFA) resin layer having 10 $\mu$m thickness formed on the supporting member 21*a*.

Figure 10:
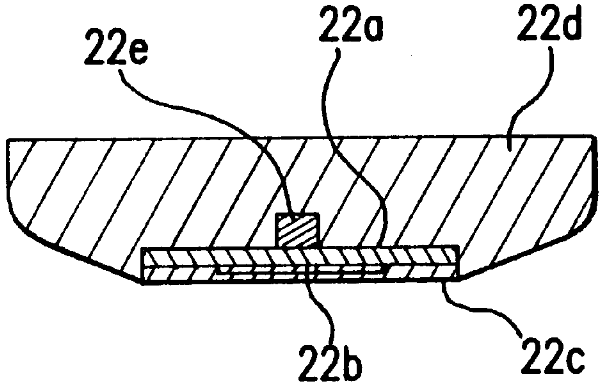
FIG. 10 is a structural view of the heating element used in the first embodiment of the present invention.

The heating element 22 is constituted from the substrate 22*a*, heat resistive layer 22*b*, protective layer 22*c*, heat insulative holder 22*d* and heat sensor 22*e* as indicated in FIG. 10. As the substrate 22*a*, heat resistive and insulating materials such as alumina are preferably used. As the heat resistive layer 22*b*, electric resistive materials such as silver-palladium (Ag—Pd) alloy are preferably used. As the protective layer 22*c*, a heat resistive, electric insulative, good durable and friction resistive materials such as glass are preferably used. As the heat insulative holder 22*d*, heat resistive materials such as phenol resin, fluoro resin and silicone resin are preferably used. As the heat sensor 22*e*, relatively small heat sensors such as thermistor or thermometer are preferably used. The heating element 22 is prepared by forming the heat resistive layer 22*b* of silver palladium alloy on the alumina substrate 22*a* by screen printing method as a 10 $\mu$m thickness, 6 mm width stripe, forming the protective layer 22*c* by glass coating material as 10 $\mu$m thickness and finally attaching a thermistor as the heat sensor 22*e* on the heat insulative holder 22*d* which is made from phenol resin.

Figure 11:
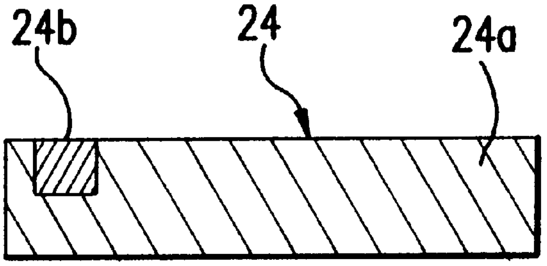
FIG. 11 is a structural view of the heat insulating element used in the first embodiment of the present invention.

In addition, the heat insulating member 24 is provided so as to ensure the contact between the fusing film 21 and the heating element 22 as indicated in FIG. 11. Also as the heat insulating member 24, materials which have good heat insulative property, good heat resistive property, good durability and friction resistivity are preferably used. The heat insulating member 24 is made from silicone rubber having polytetrafluoroethylene (teflon) coating formed thereon.

The heat sensor 24*b* (thermistor) for detecting a surface temperature of the fusing film 21 is mounted on the main body 24*a* of the heat insulating element as indicated in FIG. 11. The heat insulating 24 may be formed as a plate shape, a roller shape or a belt shape.

The pressure roller 25 is prepared by lining heat resistive silicone rubber having 8 mm thickness and 40 degree rubber hardness (defined by JIS-A:Japan industrial standard-A) on a stainless steel core. The roller has 30 mm outer diameter. The heat resistive silicone rubber may be substituted by heat resistive fluorine-containing rubber. The pressure roller 25 is rotated with the same moving speed of the surface of the fusing film 21 by a moving power source (not shown).

The backup roller 26 has he same feature with the pressure roller 25 except that the resistive silicone rubber has 50 degree of rubber hardness. The backup roller 26 is positioned against to the surface of the pressure roller 25. The backup roller is installed so as to rotate along with the movement of the fusing film 21. Another moving power source may be coupled to the backup roller 26 optionally.

The detaching roller 30 is installed so as to detach the copy sheet 31 from the fusing film 21 using a large curvature itself. In this feature, the copy sheet 31 is detached from the surface of the fusing film automatically. The detaching roller is a SUS roller having 12 mm outer diameter. Side guide members (not shown) for correcting a deviation of the rotating position of the fusing film 21 are provided at both sides of each detaching roller 30 and tension roller 29. The fusing film 21 of the present invention is transported stably among these rollers without any feedback position controller by these side guide members.

As disclosed in FIG. 8, the fusing film 21 is moved in the direction indicated by the arrow at almost the same speed with the moving speed of the recording paper 31 by rotating force generated by the moving roller 28. There is another moving power source (not shown) coupled to the pressure roller 25 in order to stable the rotation of the fusing film 21 during fusing process. The moving speed of the surface of the pressure roll is same speed with the moving speed of the surface of the fusing film 21.

Figure 12:
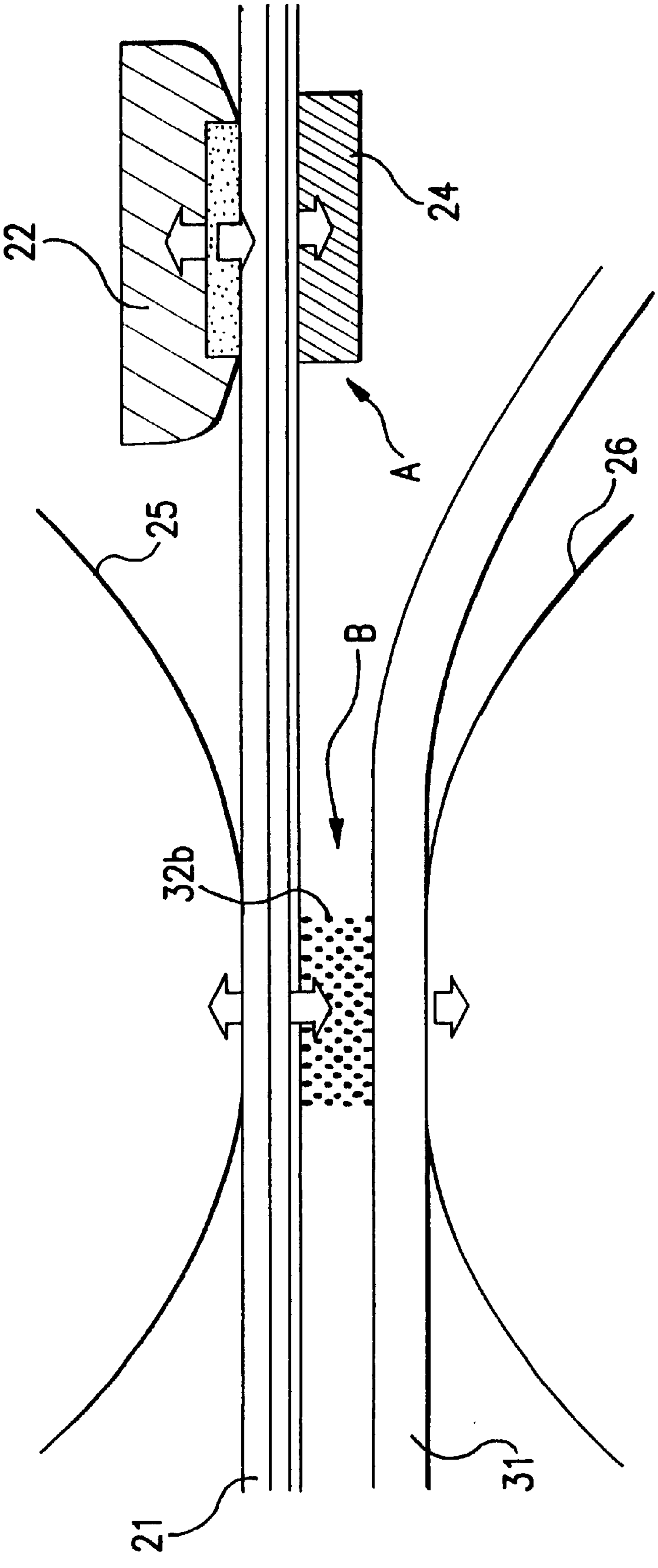
FIG. 12 is a detailed structure of the heat accumulating portion and the heat and press portion of the first embodiment of the present invention.

The fusing device of this embodiment is controlled as described below. When the image reproducing machine is idling, the rotation of the fusing film 21 is stopped and any electric energy is not applied to the heating element 22. Then, the printing operation is cued and a developing operation is done. After the developing operation, color toner image 32*a* constituted from yellow toner, magenta toner image, cyan toner and optionally black toner is transferred onto the recording paper 31 respectively at each imaging cycle and the recording paper carrying the toner image 32*a* is transported to the fusing step B by a paper transporting means (not shown). Then, a pulse voltage is applied to the heating element 22 from the voltage applying control circuit 23 so as to generate heat energy at the heating element 22. Temperature of the heating element 22 is monitored by the heat sensor 22*e* and controlled so as not to generate unnecessary heat energy. As indicated in FIG. 8 and FIG. 12, the temperature of the fusing film 21 is increased followed to the increasing of the temperature of the heating element 22, then the temperature of the fusing film is reached to a necessary temperature for fusing operation, then the fusing film is started to rotate. The surface temperature of the fusing film 21 is detected by the heat sensor 24*b* and controlled by the heating element 22 so that the surface temperature is kept as a sufficient temperature during the copy sheet pass through the heater 22. Since the heat capacities of the heating element 22 and the fusing film 21 is low, the temperature of the fusing film 21 is increased drastically to an appropriate temperature by applying the pulse voltage. Therefore, instant-start operation is possible in this embodiment. In addition, to accomplish the good mechanical contact and heat transmission between the heating element 22 and the fusing film 21 at the heat accumulating step A, contacting pressure is applied onto the fusing film 21 by the heat resistive material 24.

The heat-accumlated portion of the fusing film 21 is transported to the heat transferring portion B from the heat accumulated portion A accompanied with an sufficient heat energy required to the following fusing operation. At this time, heat energy in the fusing film is decreased gradually due to outgoing radiation energy therefrom. However, total energy loss due to the outgoing radiation is sufficiently low to neglect from the consideration because the only one material contacted to the fusing film 21 is air which has sufficient low heat conductivity and the transporting time of the fusing film 21 from the position A to position B is quite short such as 0.1 sec. Therefore, actual temperature loss of the fusing film 21 between step A and B is almost 1° C. in this embodiment.

The prefixed toner image 32*a* on the copy sheet 31 is transported into the heat transferring step B, heated and fused by the accumulated heat energy of the fusing film 21. At this time, preferably, the heat energy is applied to a whole portion of the multilayered toner image so as to obtain sufficient light transparency through the fixed toner image. As a pressure condition, a pressure enough to flatten the toner layer (each color toner layer of color toner image) in a direction of the thickness of the toner layer. The pressure is generally in a range from 100 to 1500 N, preferably, 600 N pressure is applied. Thus, sufficient flatness and light transparency of the color toner image is obtained.

The toner image is changed from a melting state to a softening state by releasing heat energy therefrom and increases melt viscosity during transportation from the heat transferring step B to copy sheet detaching portion C (corresponds to a position where the detaching roller 30 is located). At the detaching portion C, the copy sheet 31 carrying the toner image 32*c* is self-stripped from the fusing film 21 due to high curvature of the detach roller 30 itself. The toner layer has a greater coagulated force and less adhesive force to the releasing layer 21*b* of the fusing film 21 at this portion compare to them at the heat transferring step B. Thus the copy sheet 31 carrying the toner image 32*c* is detached without any offset from the fusing film 21. Then a superior color fixed image is obtained.

The fusing apparatus was incorporated into a color copying machine (A-color 635; Product name of Fuji Xerox Co. ltd., ) so that non-fixed color toner image was fixed under 160 mm/sec process speed. The resulting toner image was an excellent image which had great color reproductivity and fusing property. No offset and no stains on the fusing film 21 were detected during 500 copy image reproducing cycle. Also a durability experiment was conducted corresponding to a continuous 100,000 copying. During the experiment, no mechanical deterioration, no offset and no stains were detected. In this embodiment, any releasing materials such as silicone oil were not used on the fusing film 21, however, it can be used in an appropriate condition. In addition, by changing the heat accumulating condition to the fusing film 21 and the heat transferring and cooling condition at the heat transferring station B, the light transparency and surface flatness of the fixed toner image may be varied. Also, the surface flatness of the fixed toner image can be changed by changing a distance and timing between the detach step C and heat transferring step B.

Embodiment 2

Figure 13:
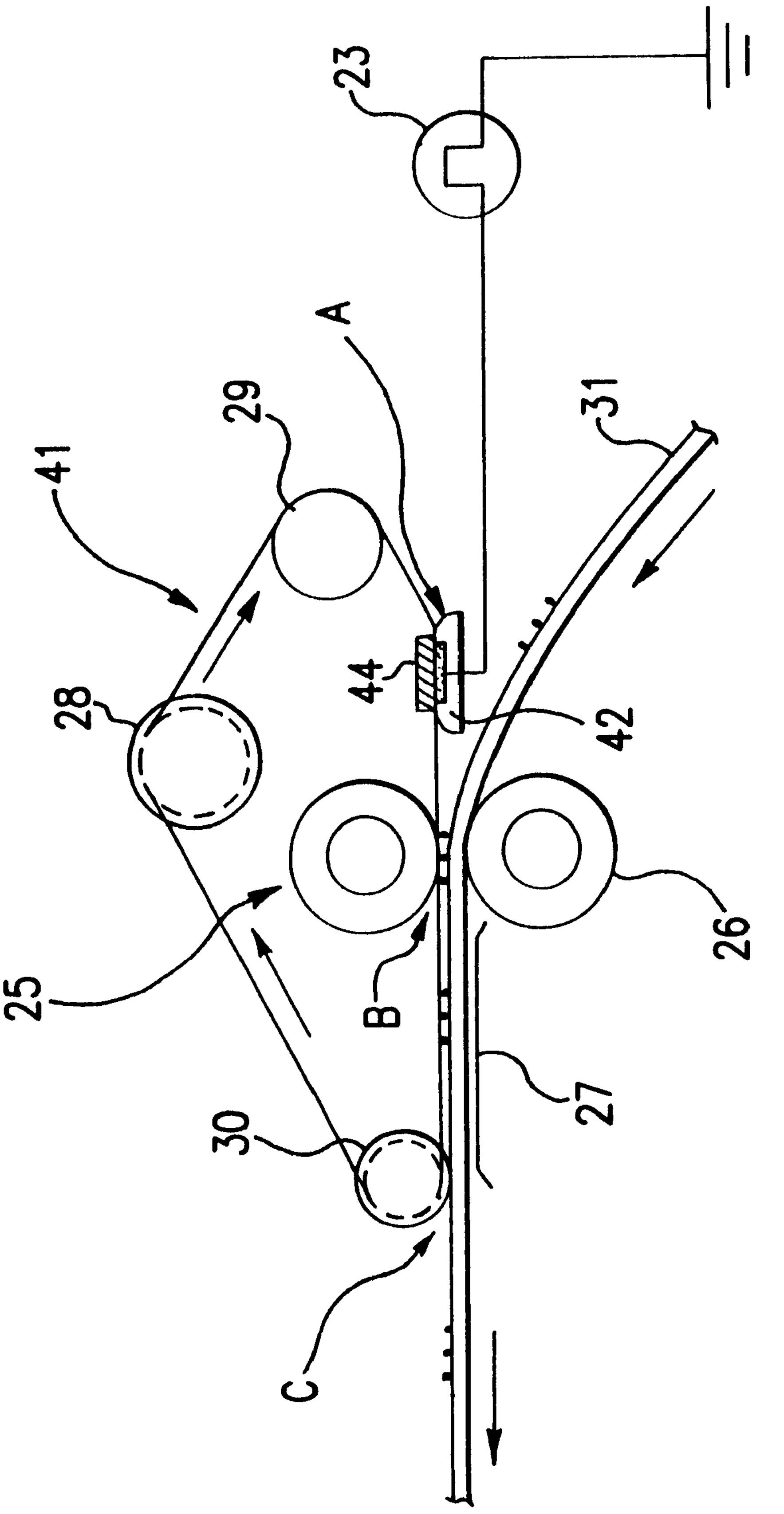
FIG. 13 is a schematic view of the second embodiment of the present invention.
Figure 14C:
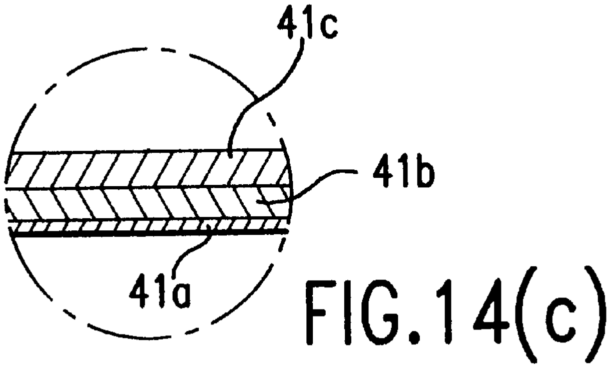
FIG. 14(*a*) is a detailed structure of the fusing film and the heating element of the second embodiment of the present invention and FIG. 14(*b*) is an explanatory view of the surface condition of the heating element of the second embodiment of the present invention.
Figure 14A:
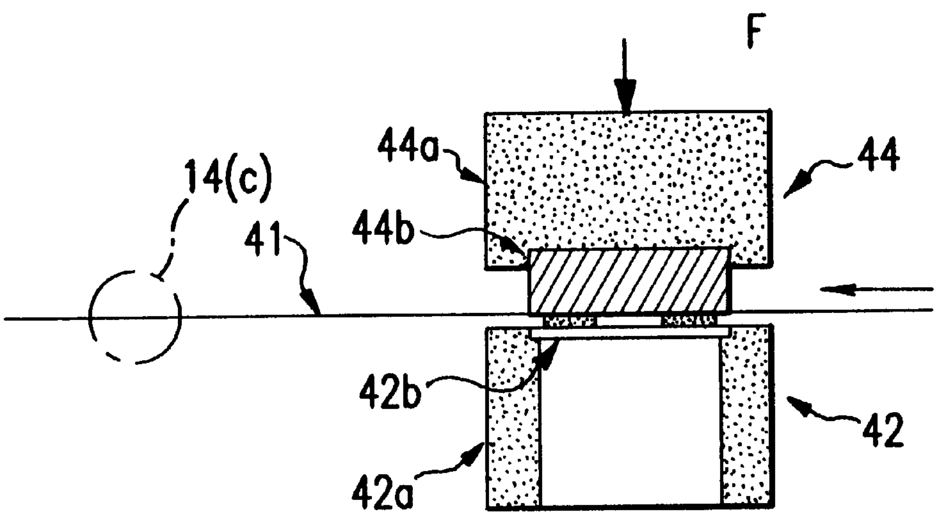
Figure 14B:
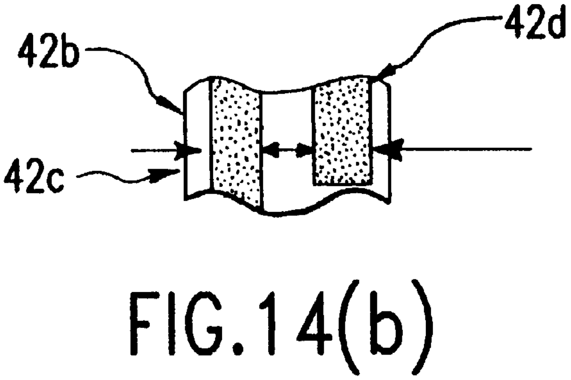

The second embodiment of the present invention is disclosed in FIG. 13. The second embodiment has a different kind of fusing film 41, as the heating medium, a heating element 42 and a heat insulating material 44 compare to the embodiment 1. The fusing film 41 has, as indicated in FIG. 14(*a*), a base layer containing a polyimide film 41*a*, nickel film 41*b* and a releasing layer 41*c* containing polytetrafluoroethylene layer formed on the nickel film 41*b*. The actual size of the fusing film was 220 mm width and 132 mm diameter. The heating element 42 comprises a heater holder (phenol resin) 42*a* and a ceramic heater 42*b* mounted thereon as indicated in FIG. 14(*a*). The heating element 42 is mounted against to the surface of the fusing film 41 opposite to the heat insulating material 44 as indicated in FIG. 13. The ceramic heater 42*b* containing two stripes of heating element 42*d* (each of them has 4 mm width and 2 $\mu$m thickness and 10 Ωcm resistivity) is formed on the ceramic substrate 42*c*. The heat insulating member 44 comprises silicone rubber pad 44*b* adhered onto the pad holder 44*a* (made from aluminum). The heat insulating member 44 the member is mounted on the reverse side of the fusing film 41 so as to press the fusing film 41 at the pressure of weight F (100N/220 mm). The fusing apparatus of present embodiment worked similarly to the fusing apparatus of embodiment 1.

Embodiment 3

Figure 15:
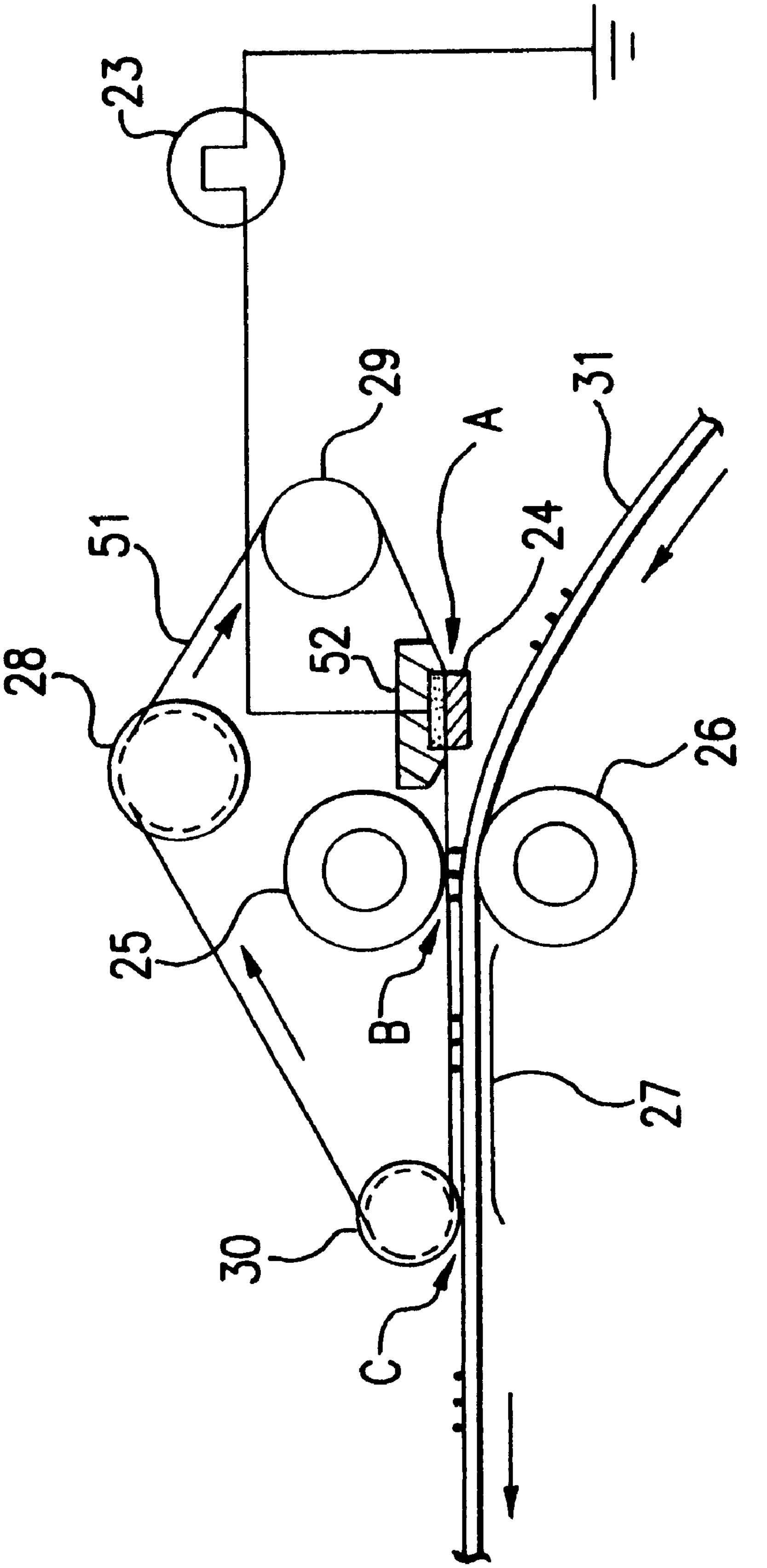
FIG. 15 is a schematic view of the third embodiment of the present invention.
Figure 16:
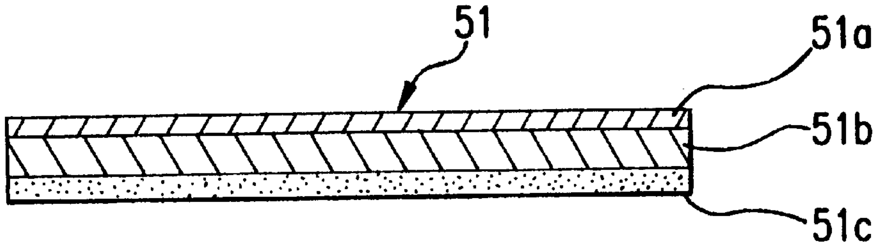
FIG. 16 is a cross-sectional view of the fusing film used in the third embodiment of the present invention.

The third embodiment of the present invention is disclosed in FIG. 15. The fusing film 51, as the heating medium, itself generates heat energy by receiving an electric current. The fusing film 51 comprises an electric resistive layer 51*a*, a conductive layer 51*b* and a releasing layer 51*c* as disclosed in FIG. 16. The contact-type current electrode 52 contacts to the electric resistive layer 51*a* of the fusing film 51 directly to apply the electric current.

The fusing film 51 may be made by various method. Such fusing films may be fabricated by forming several functional layers on a base member. One of the electric resistive layer 51*a* or conductive layer 51*b* may be functioned as the base member during the fabricating process of the fusing film.

The fusing film can be made by forming the electric resistive layer 51*a* by printing and sintering method of a conductive paste thereof on one side of the conductive layer 51*b* (nickel, aluminum, copper and stainless steel or the like), then coating the releasing layer 51*c* on the other side of the conductive layer 51*b*. The releasing layer 51*c* may be silicone-type rubber or resin or fluorinated rubber or resin. The thickness of the conductive layer 51*b* is generally from 1 to 100 $\mu$m and preferably from 10 to 50 $\mu$m in terms of strength, productivity, low heating capacity and flexibility. The thickness of the electric resistive layer 51*a* is generally from 0.05 to 50 $\mu$m and preferably 1 to 10 $\mu$m in terms of strength, productivity, and low heating capacity. The volume resistivity of the electric resistive layer is generally from $10^{-4}$to $10^{4}$ Ωcm. The thickness of the releasing layer 51*c* is from 0.1 to 500 $\mu$m, preferably from 1 to 50 $\mu$m. The surface energy and the heat resistivity of the releasing layer 51*c* are preferably not more than 30 mN/m, not less than 150° C. respectively.

Otherwise, the fusing film can be made by forming a conductive layer 51*b* and a releasing layer 51*c* succeedingly on the electric resistive layer 51*a* as a base film. In this case, the electric resistive layer 51*a* may be a conductive polymer film or a conductive ceramic sheet material. As the conductive polymer film, the polyimide resin, polyalamide resin, polyamideimide and fluorine resin containing and dispersing a conductive filler such as carbon black, metal powder, conductive ceramics powder may be used. Generally, the electric resistive layer has a thickness from 0.3 to 150 $\mu$m and volume resistivity from $10^{-4}$ to $10^{4}$ Ωcm. The conductive layer 51*b* may be conductive metal such as copper, silver, conductive ceramic materials or conductive powder dispersed materials. The preferable volume resistivity of the conductive layer 51*b* is generally not more than 1 Ωcm, preferably not more than $10^{-3}$ Ωcm. The releasing layer 51*c* formed on the conductive layer 51*b* may be silicone rubber or silicone resin or fluoro-resin or silicone rubber. The thickness of the releasing layer 51*c* is generally from 0.1 to 500 $\mu$m, preferably from 1 to 50 $\mu$m in terms of mechanical strength and heat capacity. The surface energy and the heat resistivity of the releasing layer are preferably not more than 30 mN/m, not less than 150° C. respectively.

The releasing layer 51*c* may be incorporated into the conductive layer 51*b* to form a two-layered fusing film.

Figure 17:
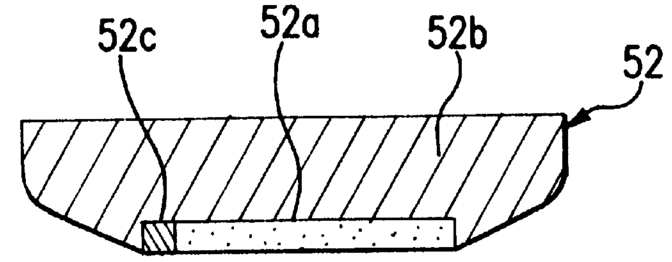
FIG. 17 is a structural view of the current inputting device used in the third embodiment of the present invention.

The contact-type current electrode 52 comprises a contact electrode 52*a*, an electrically insulating holder 52*b* and a heat sensor 52*c* as indicated in FIG. 17 and contacted to the fusing film 51 as indicated in FIG. 15. The contact electrode 52*a* may be a metal having relatively high melting point such as tungsten, molybdenum and titanium or conductive ceramics material. The electrode has volume resistivity generally not more than 1 Ωcm, preferably not more than $10^{-3}$Ωcm. The electrically insulating holder 52 may be an electrically-insulating, heat-resistive material such as ceramics, fluorine resin, silicone resin or phenol resin.

The fusing film 51 was prepared by firstly forming a nickel endless belt having 20 $\mu$m thickness, 310 mm width and 99 mm diameter (actual length of outer peripheral surface was 311 mm) by an electrocasting method as the conductive layer 51*b*, then printing and sintering nickel-aluminum mixed paste on a backside of the nickel endless belt to form electrical resistive layer 51*a* having 3 $\mu$m thickness and finally forming a perfluoroalkoxy resin layer on the other side of the nickel endless belt as a releasing layer 51*c* having 10 $\mu$m thickness. The contact-type current electrode 52 was prepared by firstly coating and sintered tungsten paste on the ceramics electric insulating holder 52 in 10 $\mu$m thickness and 8 mm width as the contact electrode 52*a* and then mounting a thermistor thereon as heat sensor 52*c*.

Figure 18:
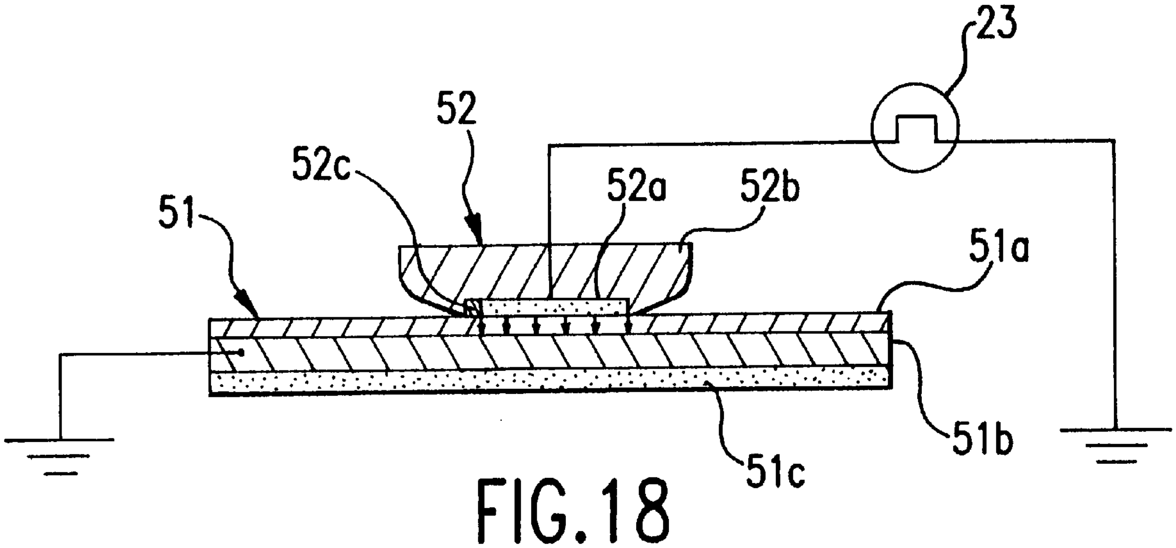
FIG. 18 is a detailed structure of the heat accumulating portion of the third embodiment of the present invention.

As indicated in FIG. 18, the conductive layer 51*b* of the fusing film 51 is coupled to a ground potential, and a current flows from contact electrode 52*a* to conductive layer 52*b* through the electrical resistive layer 51*a* to generate a Joule heating energy (indicated as an arrow) therebetween in response to pulse voltage applied by the voltage control circuit 23. Temperature of the electrical conductive layer 51*a* is detected by the heat sensor 51*c* in order to control the temperature of the electrical resistive layer 51*a* in an appropriate temperature by controlling the pulse voltage corresponding to the output of the heat sensor 51*c*.

The heat capacity of the fusing film 51 is sufficiently low to increase the temperature of the fusing film 51 to an appropriate temperature drastically by applying pulse voltage. Temperature of the electrical resistive layer 51*a* and the surface temperature of the releasing layer 51*c* is kept at almost same temperature because temperature distribution in a direction of thickness of the fusing film 51 is uniform.

The fusing apparatus was incorporated into a color copying machine (A-color 635; Product name of Fuji Xerox Co., ltd.) so that non-fixed color toner image was fixed under 160 mm/sec process speed. The resulting toner image was an excellent image which had great color reproductivity and fusing property. No offset and no stains on the fusing film 21 were detected during 500 copy image reproducing cycle. Also a durability experiment was conducted corresponding to a continuous 100,000 copying. During the experiment, no mechanical deterioration, no offset and no stains were detected. Same surface temperature of the fusing film 51 with the fusing film 21 of embodiment 1 was obtained with lower electric power.

Embodiment 4

This embodiment includes different kind of current-inputting type fusing film similar to the embodiment 3.

Figure 19:
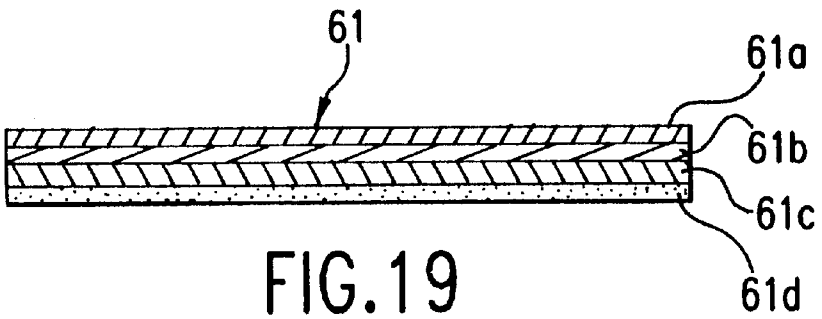
FIG. 19 is a cross-sectional view of the fusing film used in the third embodiment of the present invention.
Figure 21:
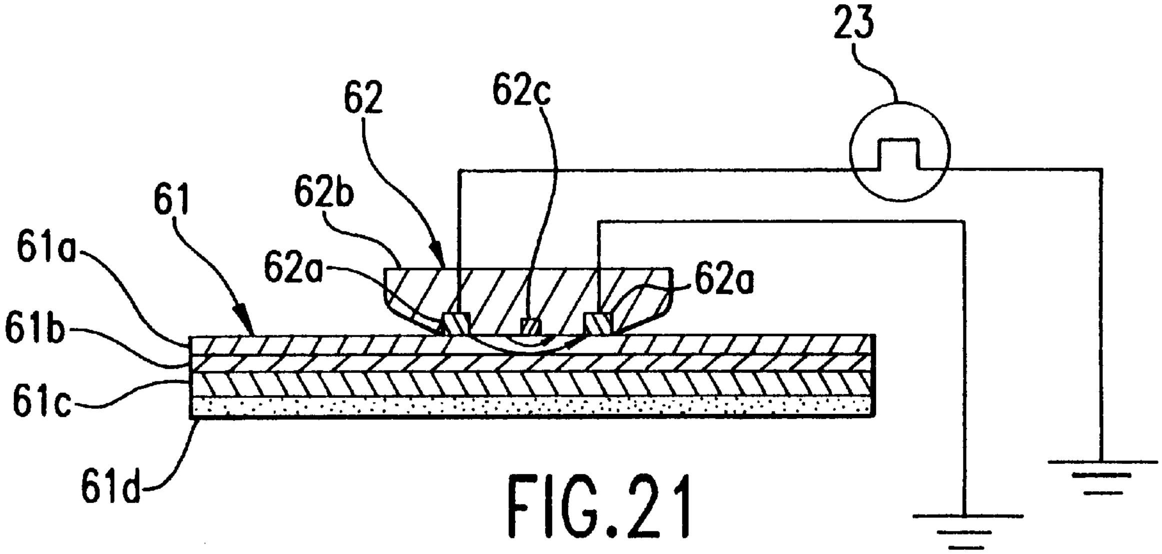
FIG. 21 is a detailed structure of the heat accumulating portion of the fourth embodiment of the present invention.

The fusing film 61, as the heating medium, of the present embodiment comprises an electrical resistive layer 61*a*, an electrical insulating layer 61*b*, a base layer 61*c* and a releasing layer 61*d* as disclosed in FIG. 19. The contact-type current electrode 62 contacts to the electrical resistive layer 61*a* of the fusing film 61. as indicated in FIG. 21. The fusing film 61 was prepared by forming firstly a nickel endless belt, as the conductive layer 61*c*, having 20 $\mu$m thickness, 310 mm width and 99 mm diameter (length of outer peripheral surface was 311 mm) by electrocasting method , then printing and sintering a glass paste layer having 10 $\mu$m thickness, as the electrical insulating layer 61*b*, on one surface of the nickel endless belt, next printing and sintering a nickel-aluminum mixed paste layer having 3 $\mu$m thickness, as the electrical resistive layer 61*a*, on the electrical insulating layer 61*b* and finally forming a perfluoroalkoxy resin layer having 10 $\mu$m thickness, as the releasing layer 61*d*, on the other side of of the nickel endless belt. The fusing film 61 has the same features with the fusing film of the embodiment 3 except for the existing of electrical insulating layer 61*b*.

Figure 20:
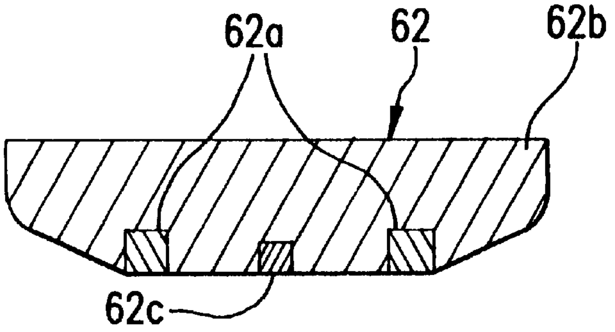
FIG. 20 is a structural view of the current inputting device used in the fourth embodiment of the present invention.

The contact-type current imputing electrode 62 comprises an electrical insulating holder 62*b*, contact electrodes 62*a* and a heat sensor 62*c* as indicated in FIG. 20. The insulating holder 62*b* is made from a ceramic material, the contact electrodes 62*a* are prepared by screen printing and sintering method of tungsten paste in 10 $\mu$m thickness, 1 mm width and 12 mm intervals of a pair of electrode and the heat sensor is a thermistor. The contact electrodes 62*a* comprises a pair of electrodes.

As indicated in FIG. 21, one of the contact electrodes 62*a* is coupled to earth potential, a current flows from one of the contact electrode 62*a* to the other contact electrode 62*a* through the electrical resistive layer 61*a* of the fusing film 61 (indicated as an arrow) to generate a Joule heating energy therebetween in response to pulse voltage which is applied to the contact electrodes 62*a* and applied by the voltage control circuit 23. Temperature of the electrical conductive layer 61 a is detected by the heat sensor 62*c* in order to control an appropriate temperature of the electrical resistive layer 61*a* by controlling the pulse voltage.

The fusing apparatus was incorporated into a color copying machine (A-color 635; Product name of Fuji Xerox Co., ltd.) so that non-fixed color toner image was fixed under 160 mm/sec process speed. The resulting toner image was an excellent image which had great color reproductivity and fusing property. No offset and no stains on the fusing film 21 were detected during 500 copy image reproducing cycle. Also a durability experiment was conducted corresponding to a continuous 100,000 copying. During the experiment, no mechanical deterioration, no offset and no stains were detected. Same surface temperature of the fusing film 61 with the fusing film 21 of the embodiment 1 was obtained with relatively lower electric power. The pulse voltage was applied along with the transporting direction of the fusing film 61 and from backside surface of the fusing film 61. The heating width along with the transporting direction of the fusing film 61 which corresponds to a width between two contact electrodes may be varied depends on process speed of the printing machine from relatively slow speed machine to high speed machine.

Embodiment 5

Figure 22:
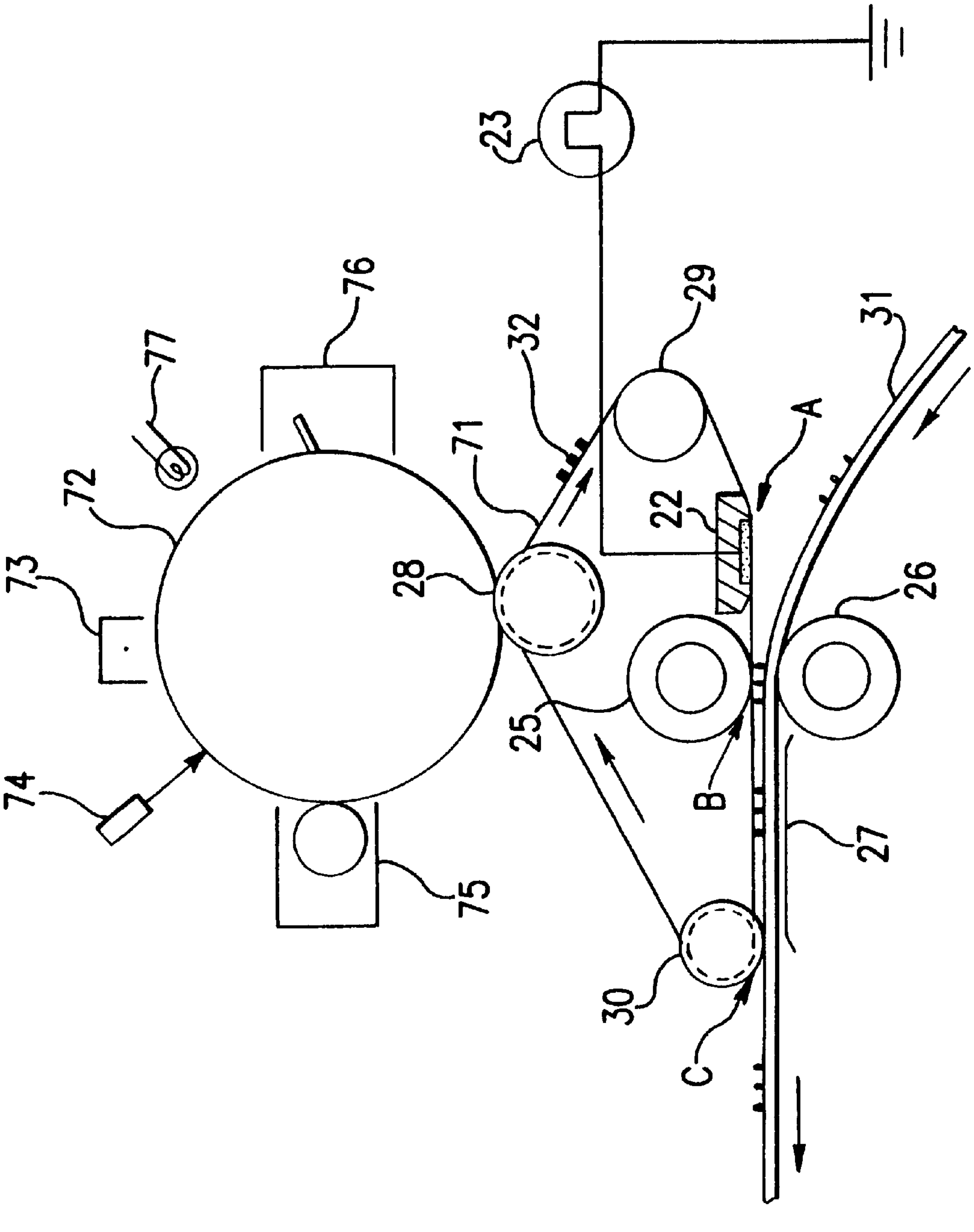
FIG. 22 is a schematic view of the fifth embodiment of the present invention.

The FIG. 22 indicates another embodiment of the present invention. In this embodiment, the fusing film 71 is also configured as the intermediate transfer belt.

The printing machine utilizing the fusing device of the present embodiment comprises a photoconductive drum 72, a charger 73 for charging the photoconductive drum 72, an exposure 74 such as laser emitting diode for exposing the photoconductive drum to form a latent image, a developing device 75 for developing the latent image to make a toned image, a cleaner 76 for cleaning remained toner particles on the surface of the photoconductive drum 72 and eraser 77 for erasing the residual potential of the photoconductive drum 72. The fusing film 71, as the heating medium, contacts to the surface of the photoconductive drum 72 at a position between developing device 75 and cleaner 76 and rotates to the direction of the arrow. An electrical biased voltage is applied to the supporting roller 28 in order to transfer the toner image from the surface of the photoconductive drum to the surface of the fusing film 71. Otherwise, the toner image may be transferred by pressure force between the photoconductive drum 72 and the fusing film 71 instead of the electrical biased voltage.

The toner image 32 formed on the surface of the fusing film 71 is transported to the heat accumulating portion A, the heat transferring portion B and detaching portion C succeedingly along with the moving of the fusing film 71. At the heat accumulating portion A, the fusing film 71 is heated by the heating element 22 and then, heat energy is accumulated onto the heated portion of the fusing film 71 and the toner image 32. At the heat transferring portion, the whole thermal energy is transferred onto the toner image 32 to melt the toner image. At this time, the pressure energy is also transferred onto the toner image to press the image flatly and to fix the image onto the copy sheet 31. Finally, the copy sheet 31 carrying the fixed toner image 32 is detached from the fusing film 71 at the detaching portion C.

Embodiment 6

Figure 23:
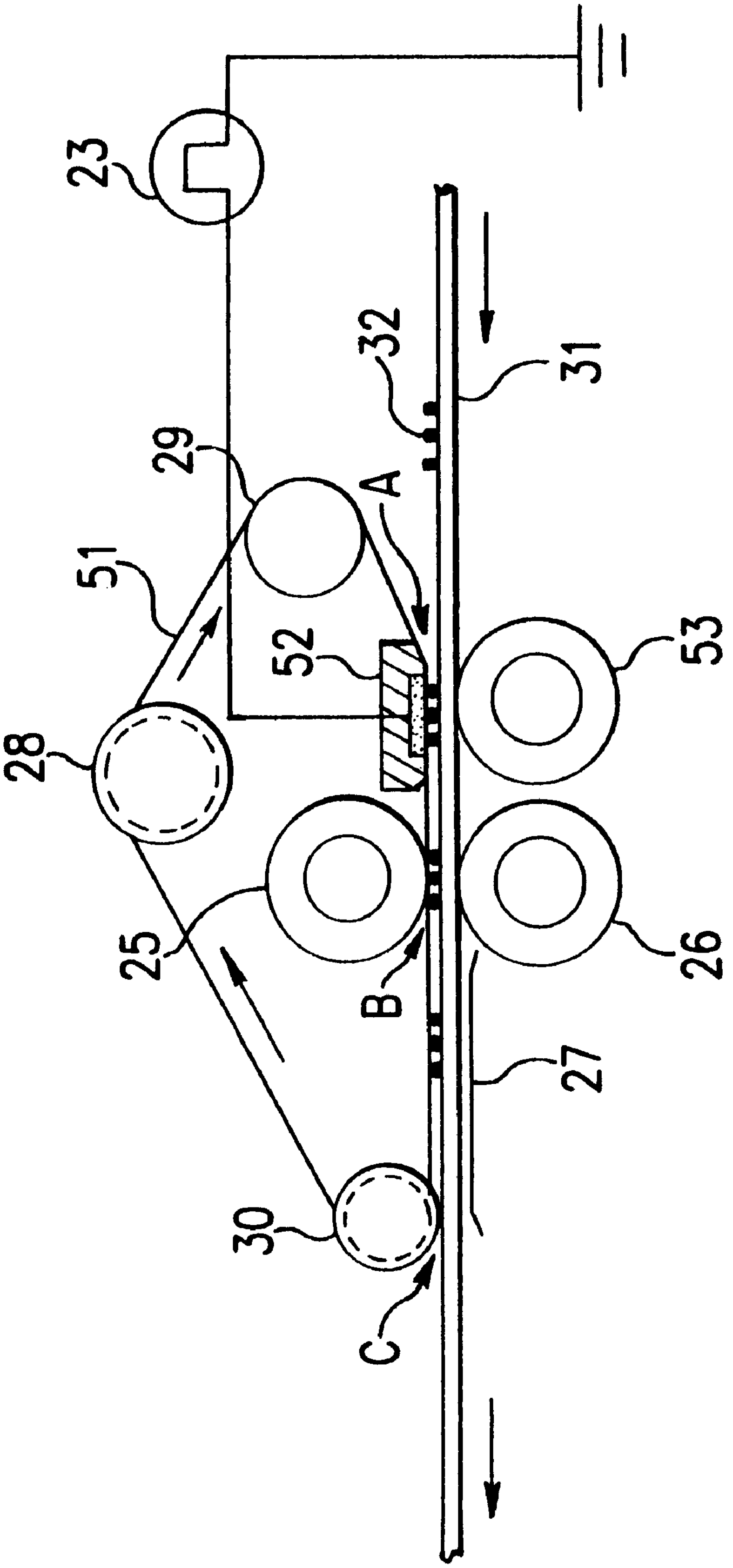
FIG. 23 is a schematic view of the sixth embodiment of the present invention.
Figure 24:
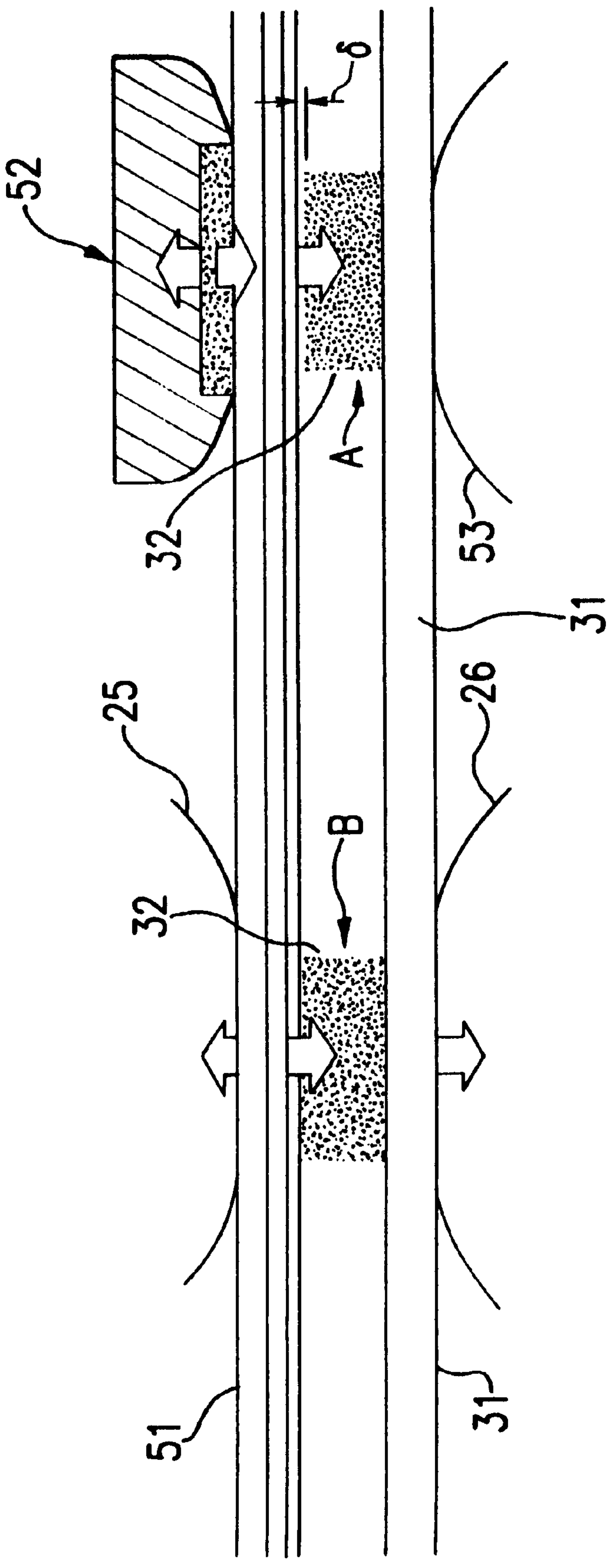
FIG. 24 is a detailed structure of the heat accumulating portion and the heat and press portion of the sixth embodiment of the present invention.

FIG. 23 indicates the embodiment 6 of the present invention . The fusing device of the embodiment 6 is similar to the embodiment 3 except for a configuration of the heat accumulating portion A. In this embodiment, the heat accumulating portion A is constituted so that the contact-type current electrode 52 is mounted so as to contact to the backside surface of the fusing film 51 and the backup roller 53 is mounted adjacent to the surface of the front-side (same side with the recording paper 31) of the fusing film 51 in order to maintain clearance δ between the surface of the toner image 32 on the copy sheet 31 and the surface of the fusing film 51 as indicated in FIG. 23 and FIG. 24.

The roller 53 is a positioning roller for transporting the fusing film 51 and positioning a portion where the copy sheet 31 is contacted to fusing film 51. The backup roller 53 is typically a heat-resistive sponge roller made from silicone rubber.

According to the present embodiment, the fusing film 51 generates heat energy in response to the inputted pulse voltage and accumulates heat energy at the heat accumulating portion A. At the same time, by due to the above configuration, the toner image 32 on the copy sheet 31 is pre-heated by the generated heat energy. Then, the toner image 32 on the fusing film 51 is transported to the heat transporting portion B. At this portion, the toner image 32 is pressed flatly and melted and fixed onto the copy sheet 31. Finally, the copy sheet 31 carrying the toner image 32 is detached at the detaching portion from the fusing film 51. The surface of the fusing film 51 is kept away from the surface of the toner image 32 on the recording paper in the predetermined clearance δ at the heat accumulating portion A, however, these surfaces may be contacted each other slightly providing the toner image 32 is not melted thereon.

Embodiment 7

Figure 25:
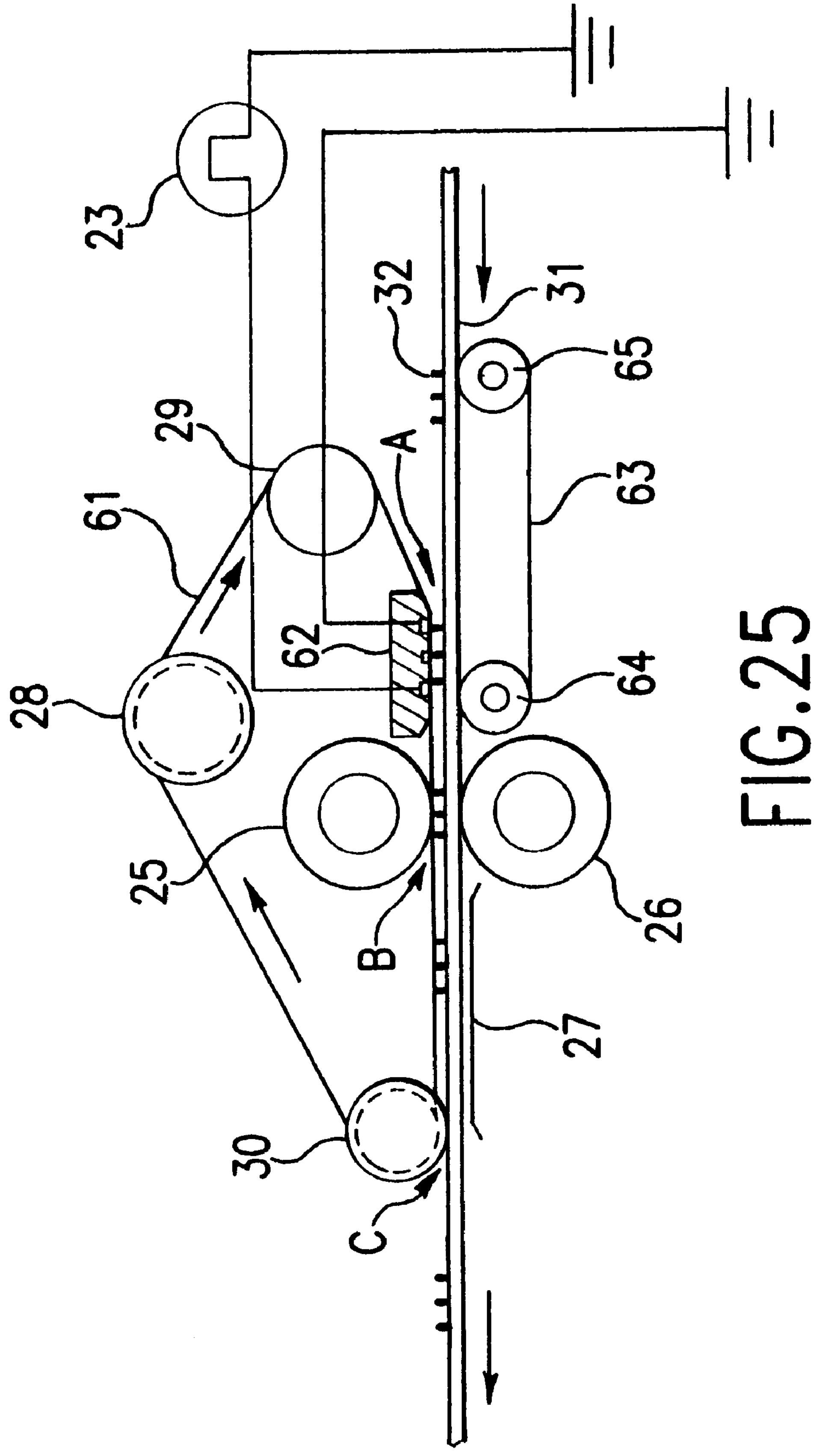
FIG. 25 is a schematic view of the seventh embodiment of the present invention.

FIG. 25 indicates the embodiment 7 of the present invention which is similar to the embodiment 4. In this embodiment, the heat accumulating portion A is constituted so that the contact-type current electrode 62 is mounted so as to contact to the backside surface of the fusing film 61 and the backup belt 63 is mounted adjacent to the surface of the front-side (same side with the copy sheet 31) of the fusing film 61 in order to maintain an appropriate clearance between the surface of the toner image 32 on the copy sheet 31 and the surface of the fusing film 61. The backup belt 63 is the belt for transporting the copy sheet 31 and positioning the copy sheet 31 at the heat accumulating portion A. Typically, the back up belt 63 is made from heat-resistive polyimide resin and the back up belt is extended and rotated between two transporting rollers 64, 65.

According to the present embodiment, the fusing film 61 generates heat energy in response to the inputted pulse voltage and accumulates the heat energy at the heat accumulating portion A. Then the toner image 32 on the copy sheet 31 is pre-heated by the accumulated heat energy. Then, the toner image 32 on the fusing film 61 is reached to the heat transferring portion B and is pressed flatly and melted and fixed onto the copy sheet 31 by both the heating energy and pressure. Finally, the copy sheet 31 carrying the toner image 32 is detached at the detaching portion from the fusing film 61. The surface of the fusing film 61 is kept away from the surface of the toner image 32 during the toner image is heated by the heat energy from the fusing film 61 at the heat accumulating portion, however, these surfaces may be contacted each other slightly providing the toner image 32 is not melted at this position.

Embodiment 8

Figure 26:
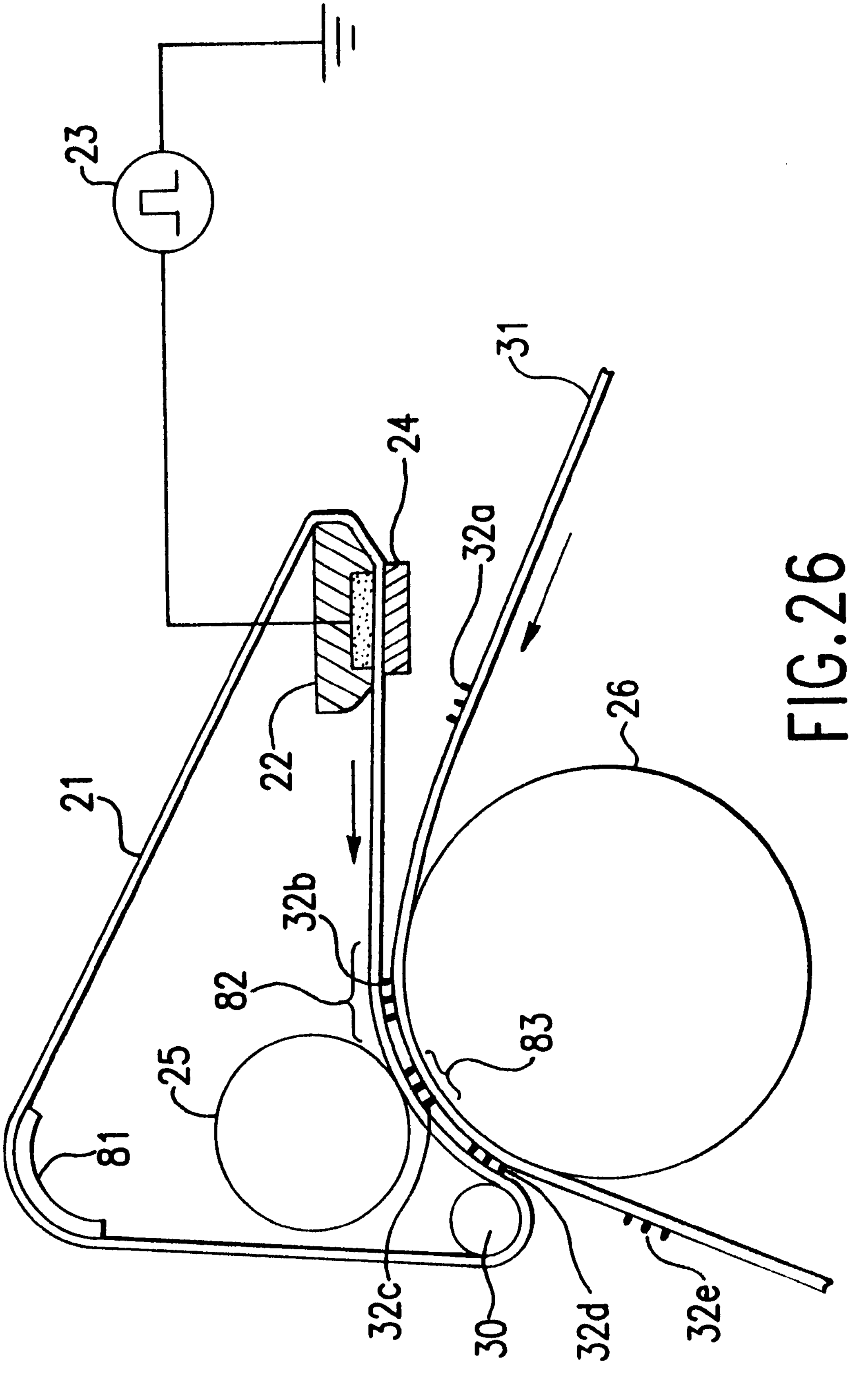
FIG. 26 is a schematic view of the eighth embodiment of the present invention.
Figure 27:
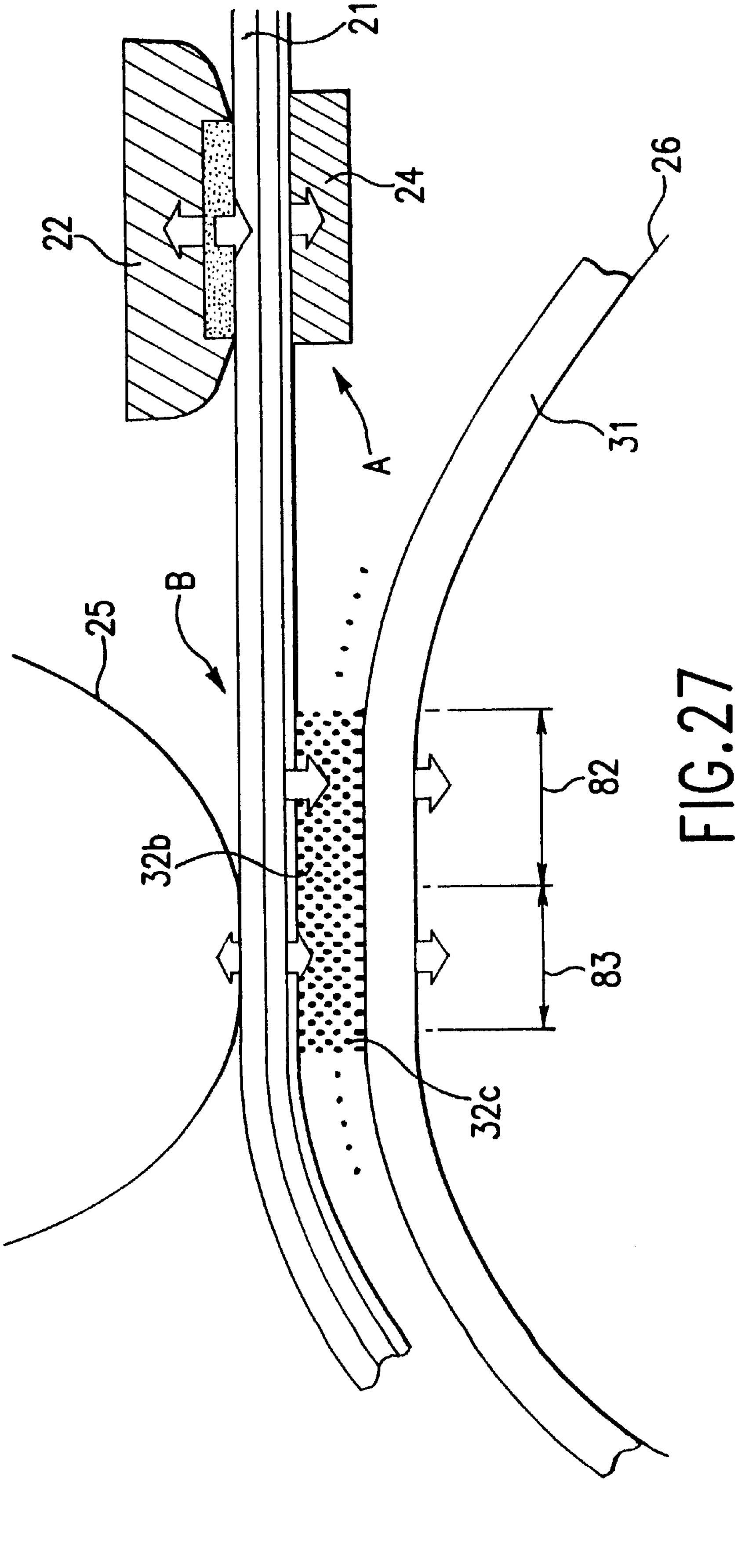
FIG. 27 is a detailed structure of the heat accumulating portion and the heat and press portion of the seventh embodiment of the present invention.

FIG. 26 indicates the embodiment 8 of the present invention. The numeral 21 indicates a fusing film, as the heating medium, for heating the toner image 32 on the copy sheet 31, the numeral 22 indicates the heating element for accumulating the heat energy onto the fusing film 21, the numeral 23 indicates a control circuit for controlling the applied voltage to the heater 22, the numeral 24 indicates a heat insulating member for prohibiting the energy loss from the heating element 22, the numerals 25 and 26 indicate a pressure roller and a backup roller respectively for pressing and supporting the fusing film 21 and the copy sheet 31 and the numeral 30 indicates a detaching roller for detaching the copy sheet 31 from the fusing film 21 after fusing process.

Each of the fusing film 21, the heating element 22, the applying voltage control circuit 23, the heat insulating member may be same with those of the embodiment 1 or other embodiments. In this embodiment, the fusing film 21 is extended among the outer surface of the heater 22, detaching roller 30 and the transporting guide member 81. The transport guide member 81 guide the fusing film 21 according to its outer shape (curved shape) and prohibit looseness of the fusing film 21 by applying an appropriate tension to the fusing film 21 by a spring member (not shown). The detaching roller 30 detaches, self-strips, the copy sheet 31 carrying toner image from the surface of the fusing film 21 using high curvature of the outer surface of the detaching roller. The detaching roller also apply moving force to the fusing film 21. The detaching roller is typically a SUS roller having 10 mm outer diameter. The backup roller 26 has a larger diameter than that of the pressure roller 25 so that the fusing belt 21, the pressure roller 25 and the backup roller constitutes two separated nip portions. The first nip portion is formed by and between the fusing film 21 and the backup roller 26 at the area 82. The second nip portion is formed by and among the pressure roller 25, the fusing film 21 and the backup roller at the position 83 following to the first nip portion. At the first nip portion, the toner image 32*b* on the copy sheet 31 contacts to the heat accumulated fusing film 21 without any contact from the high heat-capacity member such as the pressure roller 25. The heat transfer is achieved effectively at the first nip portion.

The pressure roller 25 comprises a SUS core and a silicone rubber layer which has 4 mm thickness and 40 degree of rubber hardness (JIS A) formed on the SUS core. The pressure roller 25 has 20 mm outer diameter. The surface of the pressure roller 25 is moved at the same speed with the surface moving speed of the fusing film 21 by a moving power source (not shown). The backup roller 26 comprises a SUS core, a silicone rubber layer which has 4 mm thickness and 55 degree of rubber hardness (JIS A) formed on the SUS core. The backup roller 26 has 40 mm outer diameter and mounted so as to form the first nip portion 82 and the second nip portion 83 in conjunction with the pressure roller 25. The backup roller 26 rotates in accordance with the movement of the fusing film 21, otherwise another power source may be coupled to the backup roller 26.

At the heat accumulating portion A, the fusing film 21 is heated by the heating element 22 to accumulate the heat energy onto the fusing film 21, then the heat accumulated portion of the fusing film 21 is transported to the first nip portion 82 within the heat transferring portion B. At this time, heat energy accumulated on the fusing film 21 is decreased due to an outgoing radiation thereof. However, total energy loss due to the outgoing radiation may be neglected from the consideration because the only one material contacted to the fusing film 21 is air which has sufficient low heat conductivity and the time to transport the fusing film from the position A to position B is quite short, for example 0.2 sec in this embodiment. Therefore, actual temperature loss of the fusing film 21 is almost 1° C.

The non fixed toner image 32*a* on the copy sheet 31 is transported into the first nip portion 82 and heated and fused by the accumulated heat energy of the fusing film 21. At this point, the surface of the fusing film 21 contact slightly to the surface of the toner image 32*a* on the copy sheet 31 at a relatively low pressure force which is generated by the tension force of the fusing film 21. The accumulated heat energy on the fusing film 21 is effectively transferred to the toner image 32*a* on the copy sheet 31. Thus the melted-state toner image 32*b* is obtained. The melted-state toner image 32*b* is cooled at the second nip area 82 and applied an appropriate pressure by the pressure roll 25 and the backup roll 26. Thus the fixed toner image 32*c* is obtained.

As a pressure condition at the second nip portion, a pressure enough to flatten the toner image (each color toner layer in the case of color toner image) in a direction of the thickness thereof. Generally, the pressure is in a range from 100 to 1500 N, in this case, pressure of 600 N is applied. Thus, sufficient flatness and sufficient light transparency for color toner image is obtained.

The heating condition at these point are defined that the whole portion of toner layer(s) is(are) thermally melted sufficiently to transparent incident light effectively and appropriately fixed on the copy sheet 31, which is typically the temperature more than melting point of the toner material. Therefore, such heat energy should be accumulated onto the fusing film 21 at the heat accumulating portion A.

Then, the toner image 32*c* is transported to the detaching portion C. At this position as well as during the transportation, heat energy remaining on the toner image 32*c* and the fusing film 21 is absorbed by air and the detach roller 30. The toner image 32*c* changes its state from the melted state to the softened state (32*d*) increasing its viscosity. Finally, the copy sheet 31 carrying the toner image 32*d* is self-stripped from the fusing film 21 using relatively high curvature of the detaching roller 30 itself. The toner image 32*d* has a greater internal cohesive force and less adhesive force to the the fusing film 21 at this portion compare to the toner image 32*c*. Thus the copy sheet 31 carrying the toner image 32*d* is detached from the surface of the fusing film 21 to form the final fixed toner image 32*e*.

The fusing apparatus was incorporated into a color copying machine (A-color 635; Product name of Fuji Xerox Co., ltd.) so that non-fixed color toner image was fixed under 160 mm/sec process speed. The resulting toner image was an excellent image which had great color reproductivity and fusing property. No offset and no stains on the fusing film 21 were detected during 500 copy image reproducing cycle. Also a durability experiment was conducted corresponding to a continuous 100,000 copying of A4-size paper. During the experiment, no mechanical deterioration, no offset and no stains were detected. In this embodiment, any releasing materials such as silicone oil were not used on the fusing film 3, however, it may be used. In addition, by changing accumulating condition to the fusing film 21 and the heating and pressing condition at the station B, the light transparency and surface flatness of the fixed toner image may be changed. Also, the surface flatness of the fixed toner image can be changed by changing a distance and passing timing between the detaching portion C and the heat transferring portion B.

Figure 28:
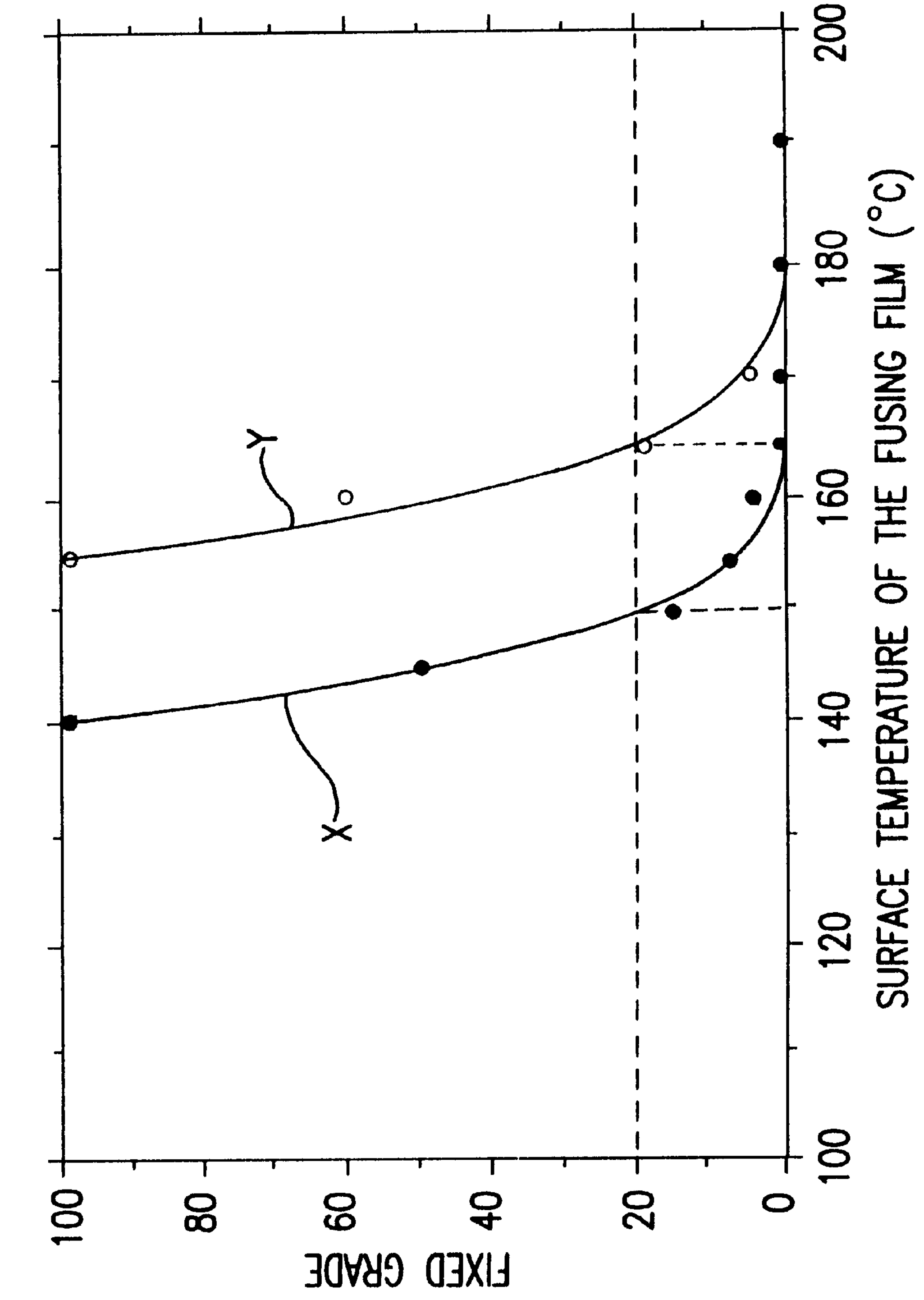
FIG. 28 is a graph showing the relationship between the temperature of the fusing film and the fixed grade of the toner image in two different conditions.

To evaluate the effect of the first nip portion 82 of the present embodiment, the same fusing device without the first nip portion 82, i.e. the backup roller 26 is changed to another backup roller which has the same outer diameter with the pressure roller 25, is incorporated to the same machine. FIG. 28 is a graph indicates a relationship between the temperature of the fusing film 21 at the heat accumulating portion A and corresponding fixed grade of the toner image on the copy sheet 31. The temperature was measured by the heat sensor 24*b* attached to the heat insulating member 24 as disclosed in FIG. 11. The vertical axis indicates the fixed grade evaluated by a bending test. The bending test is conducted so that primarily the copy sheet having a fixed solid toner image is bent inwardly at a predetermined condition, then cleaned lightly by cotton cloth and finally analyzed by optical image evaluation system to determine the peeled off portion of the toner image. The magnitude of the peeled off portion of the toner image is quantified as the fixed grade. The smaller value of the fixed grade is the better. Generally, the bench-mark value of the fixed grade is less than 20.

The fusing film had to be heated more than 165° C. to get fair fixed grade, generally less than 20 fixed grade, in the case that the first nip portion 82 was not created thereto as indicated by line Y of FIG. 28.. The fusing film only had to be heated almost up to 150° C. to get fair fixed grade in the case that the first nip portion 82 was created thereto as indicated by line X of FIG. 28. It is understand that the first nip portion 82 ensure the energy conservation corresponding to 15° C. at the heat accumulating portion A.

Embodiment 9

Figure 29A:
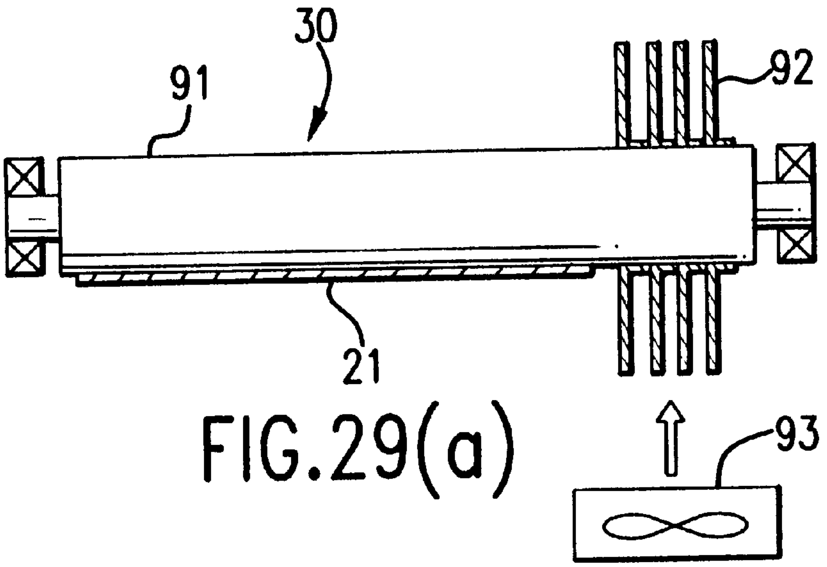
FIGS. 29(*a*) and (*b*) are both explanatory view of detaching portion of the fusing device of the ninth embodiment of the present invention.
Figure 29B:
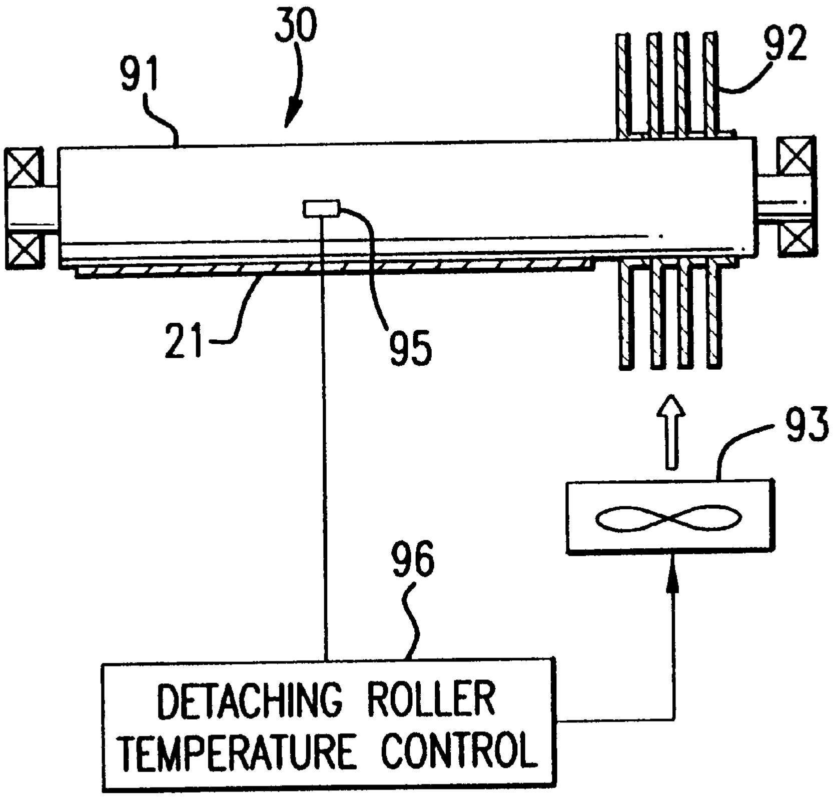

FIG. 29 indicates a detaching portion of embodiment 9 of the present invention, otherwise other features are the same with embodiment 8. In this embodiment, heat pipe 91 is adopted as the detaching roller 30. The heat pipe is thermally coupled to the cooling fin 92 so as to cool the heat pipe 91 effectively as indicated in FIG. 29(*a*). The cooling fin may be cooled by an additional cooling fan 93 to ensure the cooling operation. The additional cooling fan 93 may be controlled by an appropriate feed back operation based on the temperature detection of the heat pipe 91 using the heat sensor 95 so as only to activate the cooling fan when the temperature of the heat pipe 91 exceed the predetermined vale.

To detach recording paper 31 from the fusing film 21 effectively, temperature accumulation on the detaching roller 91 due to accumulated heat energy of the fusing film 21 should be avoided. In this embodiment, light transparent property and the surface smoothness of the fixed toner image can be sensitively varied by changing the heat accumulating condition on the detaching roller 30 as well as another heating condition at heat accumulating step A and the heat transferring condition B.

Embodiment 10

Figure 30:
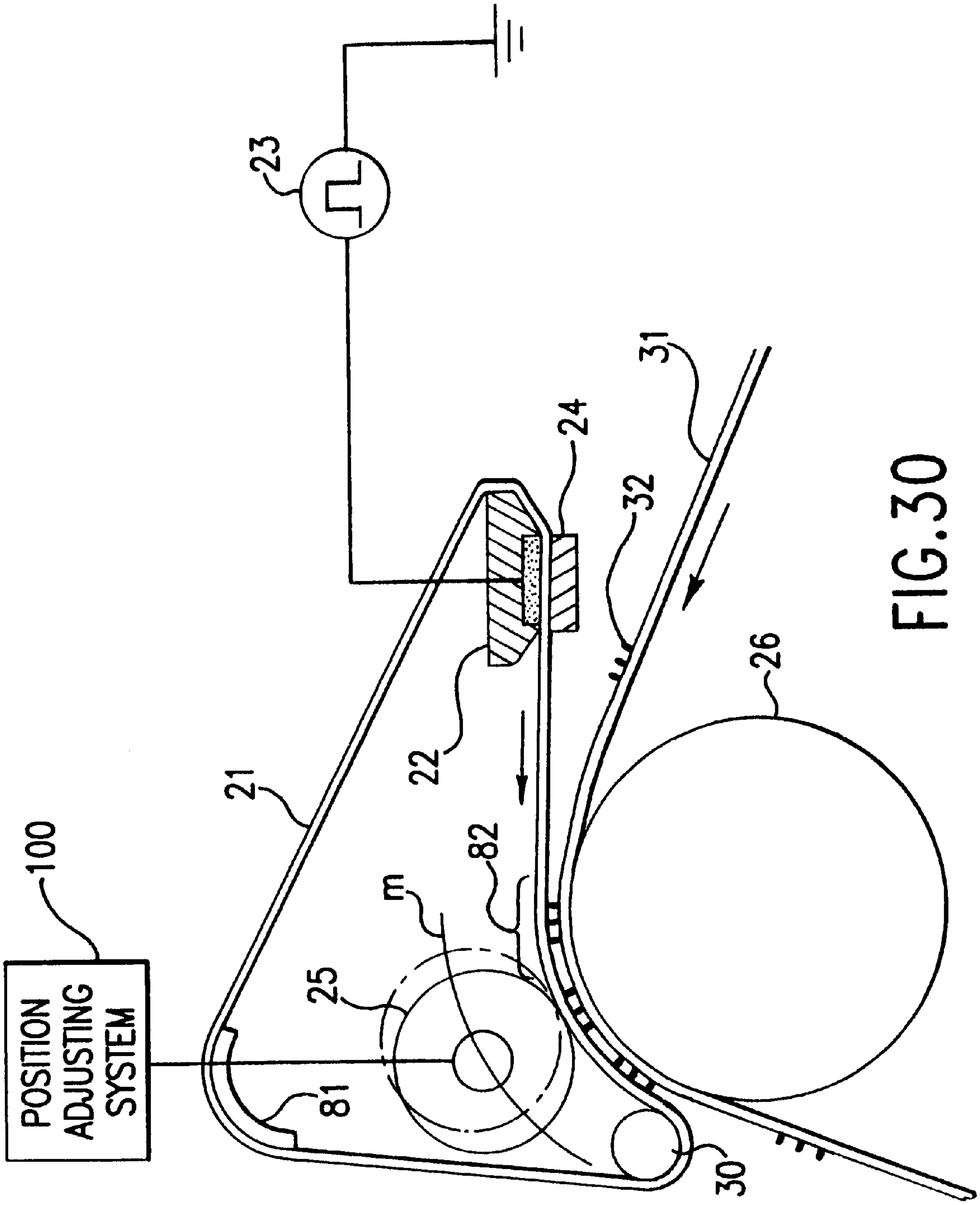
FIG. 30 is a schematic view of the tenth embodiment of the present invention.

FIG. 30 indicates the embodiment 10 of the present invention. The fusing device of this embodiment is similar to that of the embodiment 8 except for supporting structure of the pressure roller 25. In FIG. 30, the rotating axis 25*a* of the pressure roller 25 is supported movably by the supporting hole formed on the main frame of the image reproducing machine (not shown in this figure). The supporting hole is formed like a curved line m as indicated in FIG. 30. Therefore, the rotating axis 25*a* is movable along with the line m. The position adjusting system 100 adjust the contact position of the surface of the pressure roller 25 onto the surface of the backup roller 26 by moving the rotating axis along with the line m. Thus the contacting width of the first nip portion 82 can be easily adjusted by moving the position of the pressure roller 25 as indicated both of solid line and alternative dotted line in FIG. 30. Thus, the heating condition at the contacting position 82 may be varied.

Embodiment 11

Figure 31:
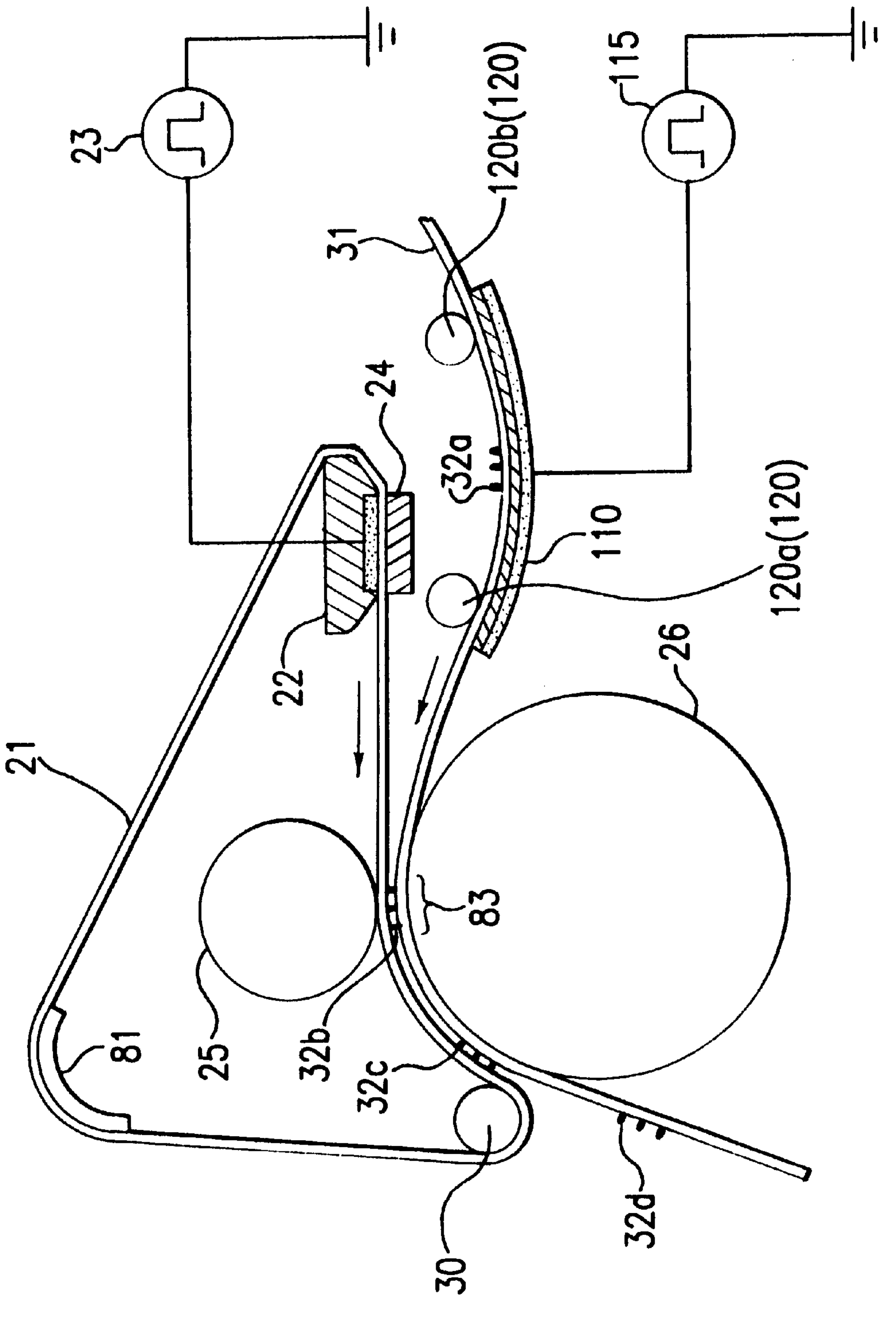
FIG. 31 is a schematic view of the eleventh embodiment of the present invention.
Figure 32A:
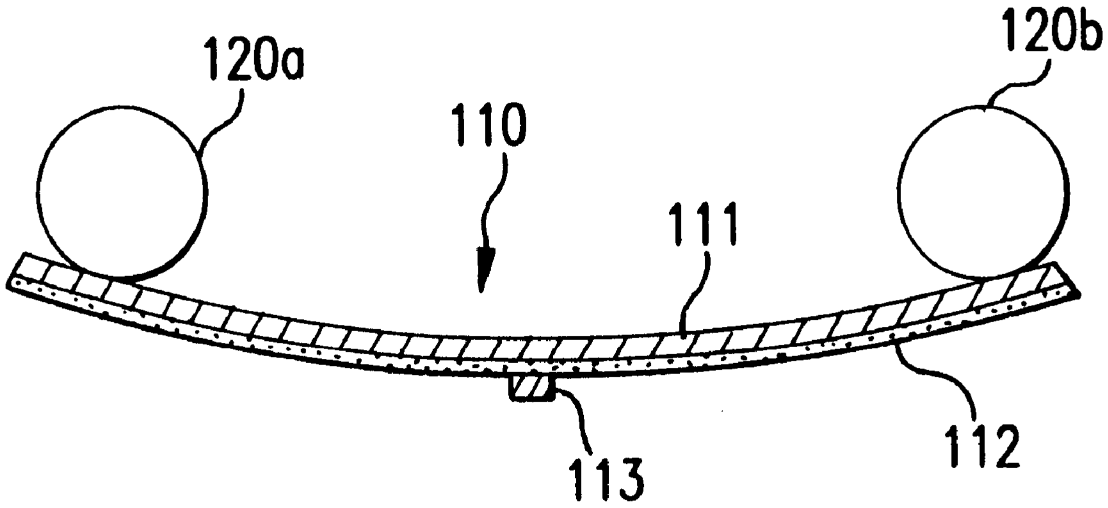
FIGS. 32(*a*) and (*b*) are both a specific structure of the preheating plate used in the eleventh embodiment of the present invention.
Figure 32B:
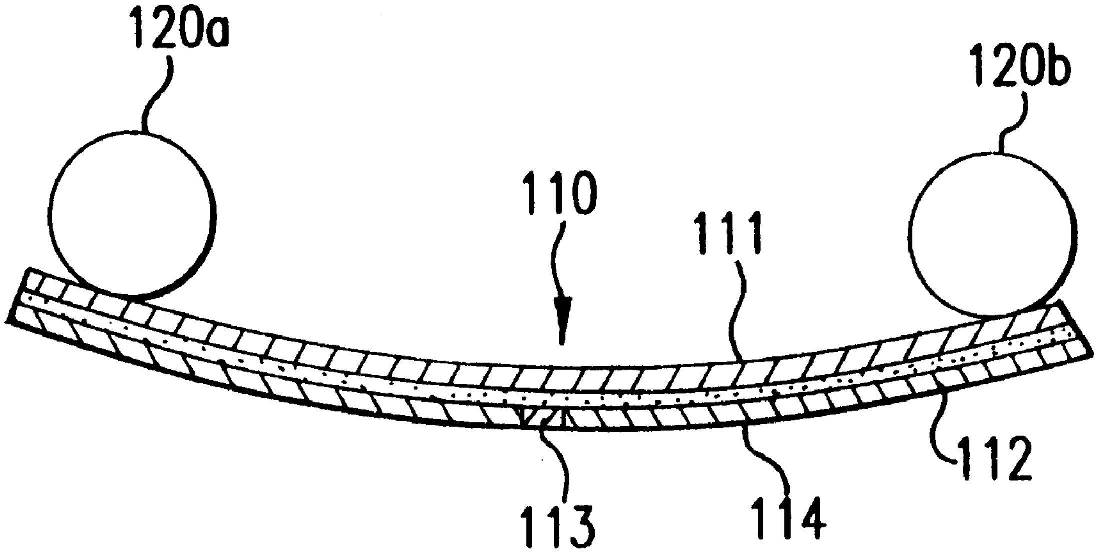

FIG. 31 indicates the embodiment 11 of the present invention. The fusing device of the present invention is similar to that of embodiment 8 except for features of pre-heating plate 110, transporting roller 120 and the existing of the first nip portion 82. In this embodiment, the pre-heating plate 110 is mounted so as to contact to the backside of the copy sheet 31 and the transporting rollers 120s are mounted facing to the pre-heating plate 110. Only one heat transferring portion 82 is formed between the pressure roller 25 and the backup roller 26. The pre-heating plate comprises the base member 111, the heating element 112 adhered onto one side of the base member 111, heat sensor 113 attached on the surface of the heating element 112 and the power control circuit 115 to control power supply to the heating element 112 in order to control temperature of the heating element 112 constant as indicated in FIG. 32(*a*). The heat insulating layer 114 may be formed on the surface of the heating element 112 to prevent heat radiation from the heating element 112 as indicated in FIG. 32(*b*). The pre-heating plate of the present embodiment typically comprises 310 mm width, 50 mm length and 100 μm thickness SUS plate 111, 10 mm width and 50 mm length heating film 112 which has been made by the patterned SUS foil formed between two polyimide films each having 25 μm thickness and the thermistor 113.

The transporting roller 120 comprises a SUS core and a 1 mm thickness silicone rubber layer having 50 degree of rubber hardness (JIS-A) formed on the SUS cores. The transporting roller has 8 mm outer diameter. The transporting roller 120 is mounted so as not to contact to the toner image formed on the copy sheet 31 by positioning the transporting roller only within 10 mm distance from both edges of the copy sheet 31 perpendicular to the paper transporting direction. Also the transporting roller comprises a pair of transporting roller 120 positioned along with the paper transporting direction. More than one pairs of transporting roller may be mounted onto this fusing device. The pre-heating plate 110 is curved downwardly along with the paper transporting direction as indicated in FIG. 32(*a*). This curvature of the pre-heating plate ensure the contact between the copy sheet 31 and the pre-heating plate 110. Both directions of the curvature, upper direction and lower direction in FIG. 33(*a*) may be acceptable in this embodiment. It is preferably constitute the device so that an appropriate tension force is applied to the copy sheet 31 in order to press the copy sheet against to the surface of the pre-heating plate during the paper transportation thereof. In order to apply such a tension force to the copy sheet 31, different rotating speeds may be introduced to the pair of transporting rollers, for example, if the pre-heating plates is curved upwardly as indicated in FIG. 32(*a*), the rotating speed of the front side roller 102*a* is set to faster speed than that of the rear sideroller 102*b* or vice versa. If the continuous paper such as computer outputting sheet or drawing outputting sheet is used as the copy sheet 31, the upward curve of the pre-heating plate may be more useful. Other methods to ensure the contact between the copy sheet 31 and the preheating plate 110 such as vacuum force generator or electrostatic attractive force generator may be usable in this embodiment.

Figure 33:
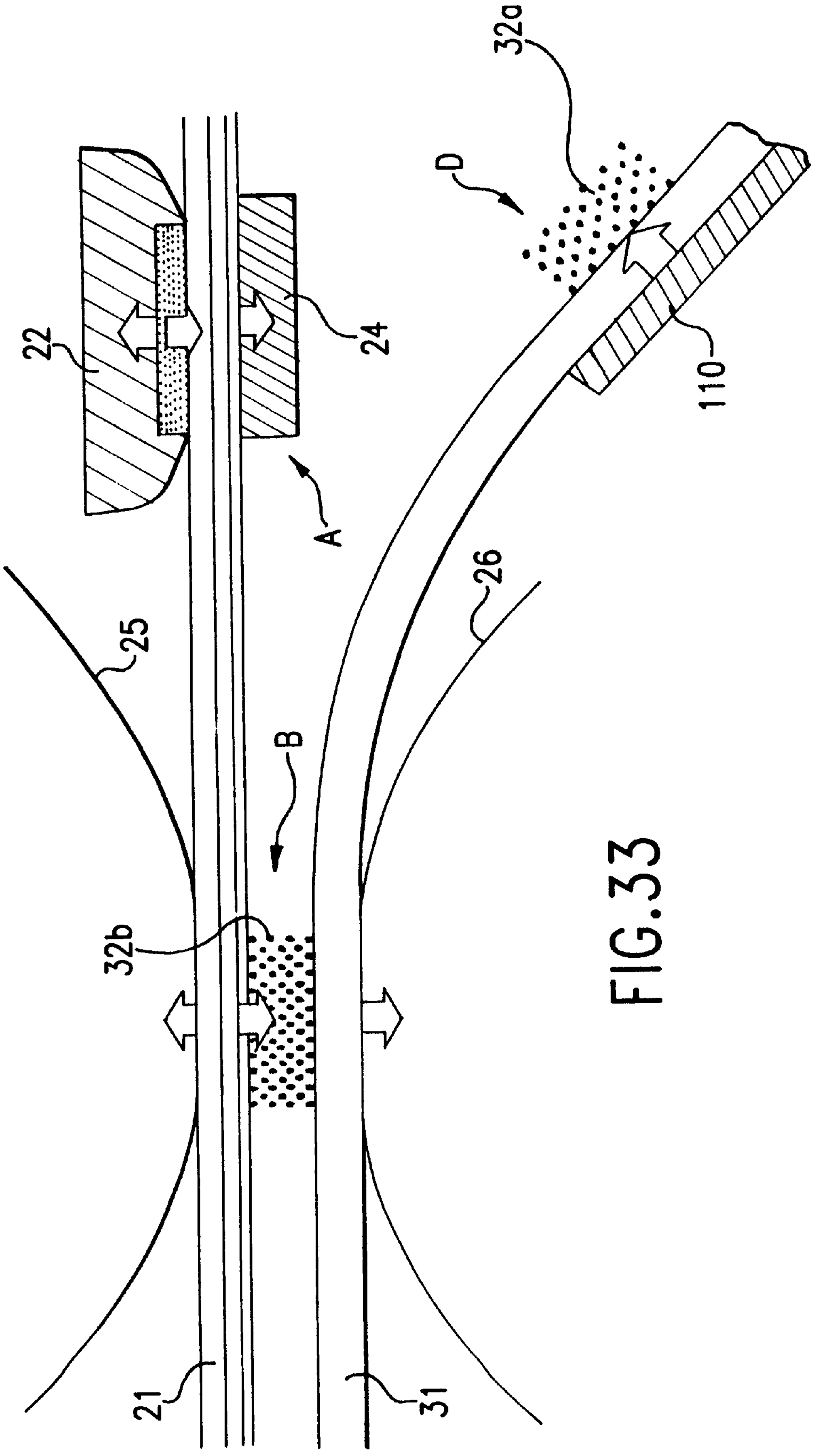
FIG. 33 is a detailed structure of the heat accumulating portion, heat and press portion and preheating portion of the eleventh embodiment of the present invention.

When the printing machine is not working, any electric power is not applied to the heating element 112 of the pre-heating plate 110. When the printing machine is working and developing process has been done, the copy sheet 31 having non-fixed color toner images of yellow, cyan, magenta toners, is transported onto the pre-heating plate 110 by the transporting roller (not shown). At the same time, an electric power is applied to the heating element 112 of the pre-heating element 110 to increase its temperature up to the predetermined temperature. The temperature is kept constantly until the copy sheet is transported thereto. Then, as indicated in FIGS. 31 and 33, the copy sheet 31 is transported along with the pre-heating plate contacting thereto. At this time, the heating energy is transferred from the pre-heating plate 110 to the toner image 32*a* on the copy sheet 31. At this point, the pre-heating condition to the copy sheet 31 may be varied by changing the temperature of the pre-heating plate, length of the preheating plate, moving speed of the copy sheet or the like. Whole heating energy necessary to fix the toner image 32*a* onto the copy sheet 31 may be accumulated onto the toner image 32*a* only by the heating energy of the preheating plate. In this case, heat transferring is not occurred at the succeeding heat transferring step B. Only the pressure energy is applied onto the toner image to fix the toner image onto the copy sheet and to cool the toner image off.

The copy sheet 31 is transported into the heat transferring portion, cooling portion, 83 where the pressure roller 25 and the backup roller 26 are contacted each other. The toner image 32*a* on the copy sheet is fixed onto the copy sheet 31 by total heat energy which comprises accumulated heat energy of the fusing film 21 and pre-heated energy of the copy sheet 31. Also, the toner image 32*a* is pressed by the pressure roller onto the copy sheet 31. Due to the pressure, the toner image gets both of smooth surface and transparency to the incident light. Finally, the copy sheet 31 carrying the fixed toner image 32*c* is self-stripped from the fusing film 21 at the detaching roller 30 due to its high curvature.

The fusing apparatus was incorporated into a color copying machine (A-color 635; Product name of Fuji Xerox Co., ltd.) so that non-fixed color toner image was fixed under 160 mm/sec process speed. The resulting toner image was an excellent image which had great color reproductivity and fusing property. No offset and no stains on the fusing film 21 were detected during 500 copy image reproducing cycle. Also a durability experiment was conducted corresponding to a continuous 100,000 copying. During the experiment, no mechanical deterioration, no offset and no stains were detected.

Figure 34:
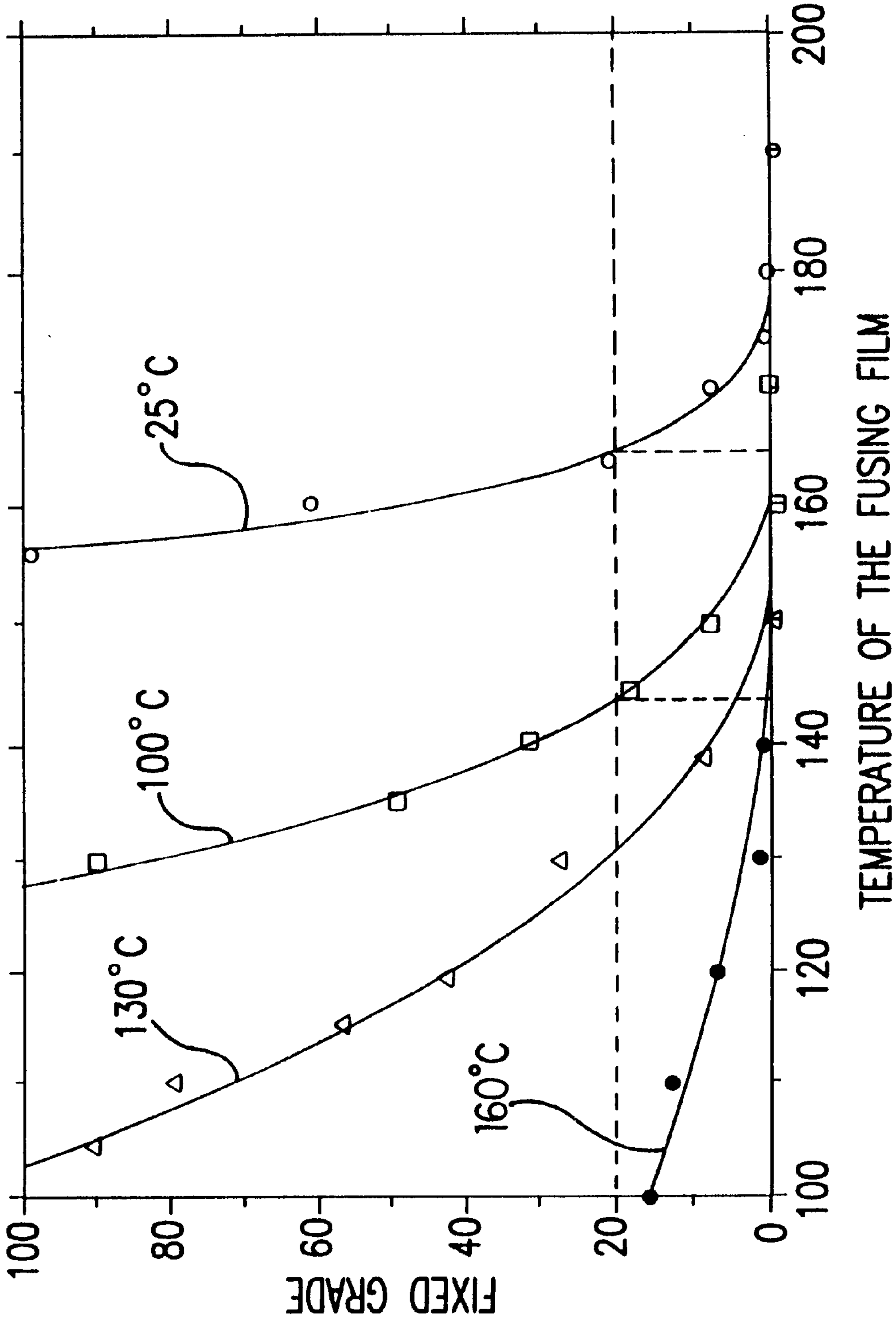
FIG. 34 is a graph showing the relationship between the temperature of the fusing film and the fixed grade of the toner image by varying the temperature of the preheating plate of the eleventh embodiment of the present invention.

FIG. 34 is a graph showing relationship between the temperature of the fusing film at the heat accumulating portion measured by heat sensor 24*b* and the fixed grade when changing the temperature of the pre-heating device 110 for 25° C. (room temperature), 100° C., 130° C., 160° C. respectively. The vertical axis represents the same fixed grade estimated by the same bending test with that of FIG. 28. It is apparently understand that if the temperature of the pre-heating plate 110 is set to 100° C., the required heating temperature of the fusing film at the heat accumulating portion is 145° C. which is 20° C. lower than 165° C. of the required heating temperature of the fusing film when the temperature of the pre-heating plate is set to 25° C. (Room temperature) providing less than 20 fixing grade. The higher temperature of the pre-heating plate, the lower temperature of the fusing film.

Figure 35:
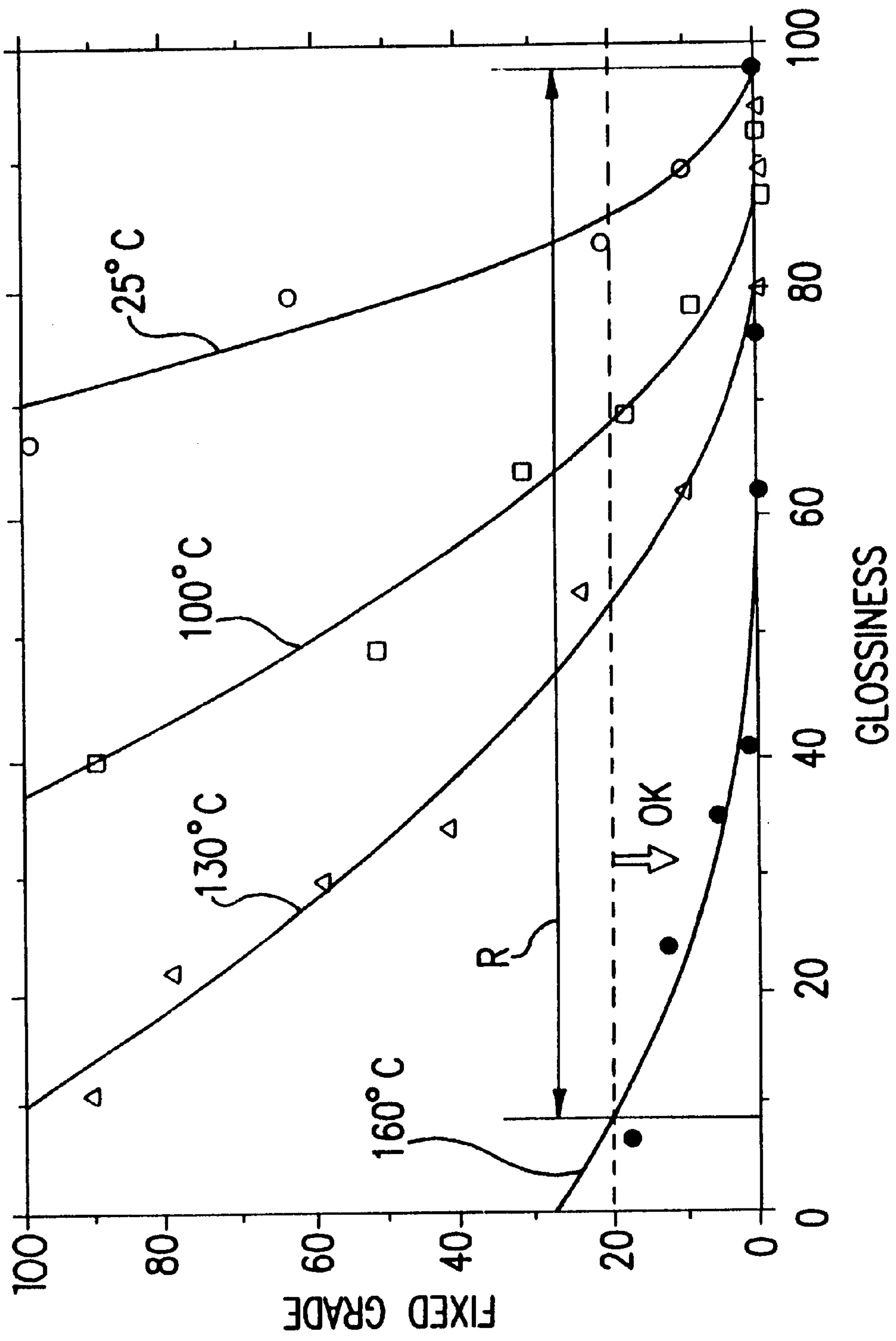
FIG. 35 is a graph showing the relationship between the glossiness and the fusing grade of the toner image by varying the temperature of the preheating plate of the eleventh embodiment of the present invention.

FIG. 35 is a graph showing relationship between glossiness (JIS Z8741-75°) and the fixing grade. If the temperature of the pre-heating plate is set to relatively high (160° C), the glossiness of the fixed toner image can be controlled within relatively wide range, indicated as R in this graph from 10 to 98, maintaining good fixed grade. Based on this results, it is understand that the glossiness of the final fixed toner image can be controlled for both of color image and B/W image on its purpose by using the same fusing apparatus.

Embodiment 12

Figure 36:
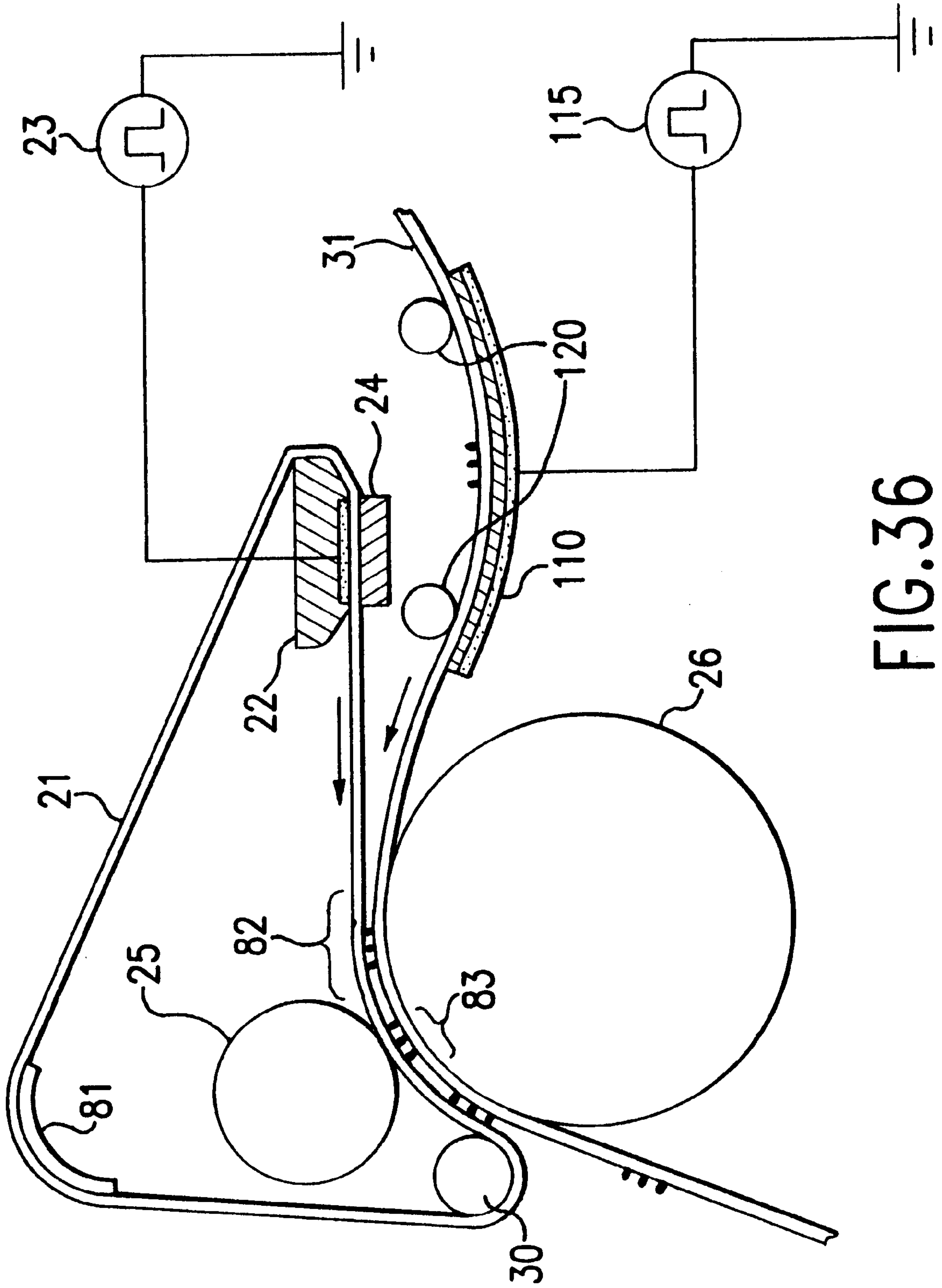
FIG. 36 is a schematic view of the twelfth embodiment of the present invention.

FIG. 36 indicates embodiment 12 of the present invention. The embodiment is similar to the embodiment 11 except for the structure of the heat transferring portion B. In this embodiment, the backup roller 26 has a larger diameter than that of the pressure roller 25 so that the pressure roller 25 and the backup roller 26 produces two separated nip portions 82 and 83 which means toner image 32*b* on the recording paper 31 contacts to the heat accumulated fusing film 21 without any contact from the pressure roller at the potion 82.

The fusing apparatus was incorporated into a color copying machine (A-color 635; Product name of Fuji Xerox Co., ltd.) so that non-fixed color toner image was fixed under 160 mm/sec process speed. The resulting toner image was an excellent image which has great color reproductivity and fusing property. No offset and no stains on the fusing film 21 were detected during 500 copy image reproducing cycle. Also a durability experiment was conducted corresponding to a continuous 100,000 copying of A4-size paper. During the experiment, no mechanical deterioration, no offset and no stains were detected. In this embodiment, further energy conservation can be achieved because there are no extra contact portion induce the heating loss at the heat transferring portion B.

Embodiment 13

Figure 37:
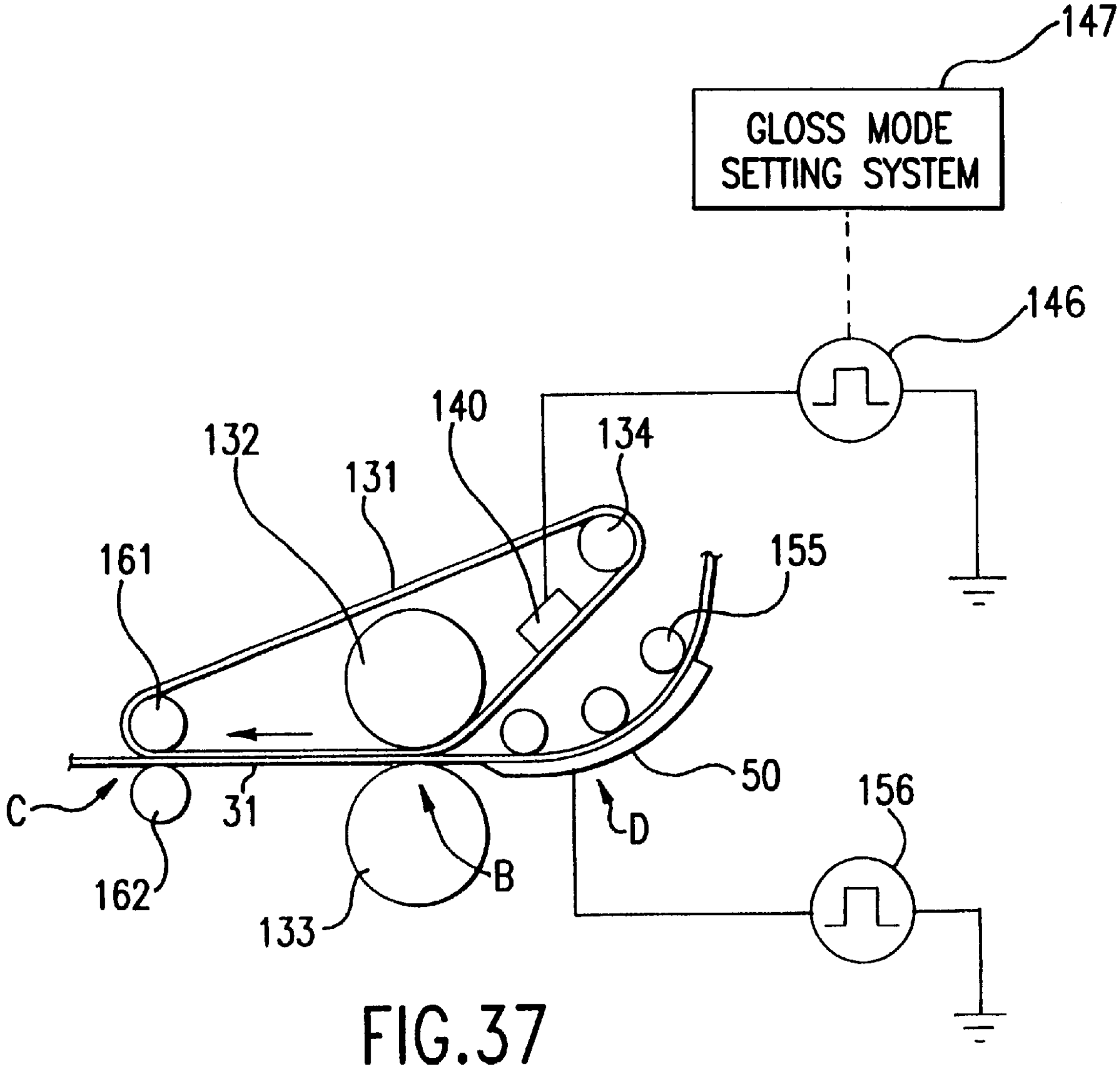
FIG. 37 is a schematic view of the thirteenth embodiment of the present invention.

FIG. 37 indicates embodiment 13 of present invention. According to this feature, document having specific glossiness can be reproduced by changing several conditions of the fusing device. In FIG. 37, the numeral 131 indicates a endless-belt fusing film comprises heat resistive film. The fusing film 131 is extended among the pressure roller 132, the tension roller 134 and the detaching roller 161. The pressure roller is coupled to a moving power source (not shown) at one end portion so that the pressure roller also serve as a moving roller of the fusing film 131 for circulating the fusing film 131 among these rollers in a direction where the recording paper is transported. The numeral 133 indicates a backup roller mounted parallel to the longitudinal direction of the pressure roller 132. The pressure roller 132 and the backup roller 133 are pressed each other under pressure between 100 to 1500 N.

Both or one of the pressure roller 132 or the backup roller 133 has an elastomer layer formed thereon in order to apply uniform pressure to the fusing film 131. Preferably, the surface of the backup roller 133 has low surface energy in terms of releasability. Preferably silicone rubber layer is formed on surfaces of both of these rollers.

Preferably, the fusing film 131 has high thermal resistivity, high releasability and high durability because the film is circulated repeatedly among these rollers and contacted to both of the toner image and the recording paper under the pressure. The fusing film 131 generally has not more than 100 μm thickness, preferably not more than 40 μm thickness. As materials of the fusing film 131, polymer films such as polyimide film, polyetherfilm, PES film, perfluoroalkoxy resin film or a metal foil having fluoro-resin coating such as polytetrafluoroethylene, perfluoroalkoxy, fluorine-ethylne-propylene may be preferably used. At least one side of the surface of the fusing film 131 where the toner image is contacted, may be formed as a smooth surface not more than surface roughness (Ra) 0.3 μm, preferably not more than 0.1 μm in order to obtain high gloss toner image.

Figure 38:
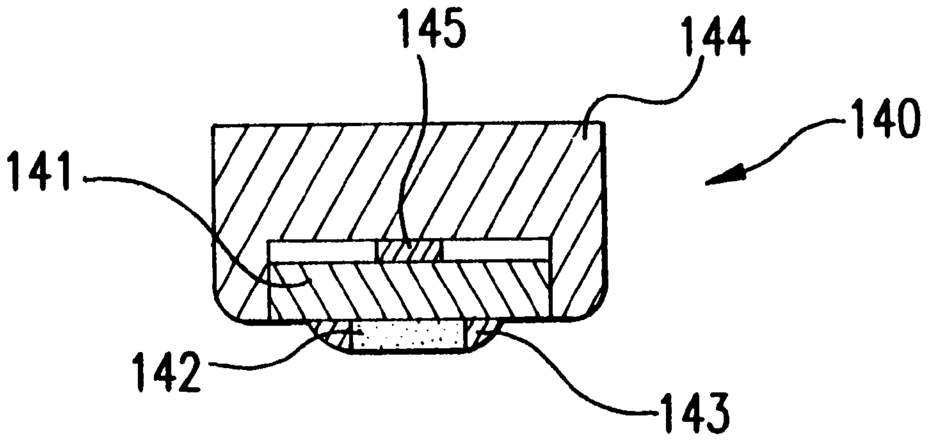
FIG. 38 is a cross-sectional view of the heating element used in the thirteenth embodiment of the present invention.
Figure 39:
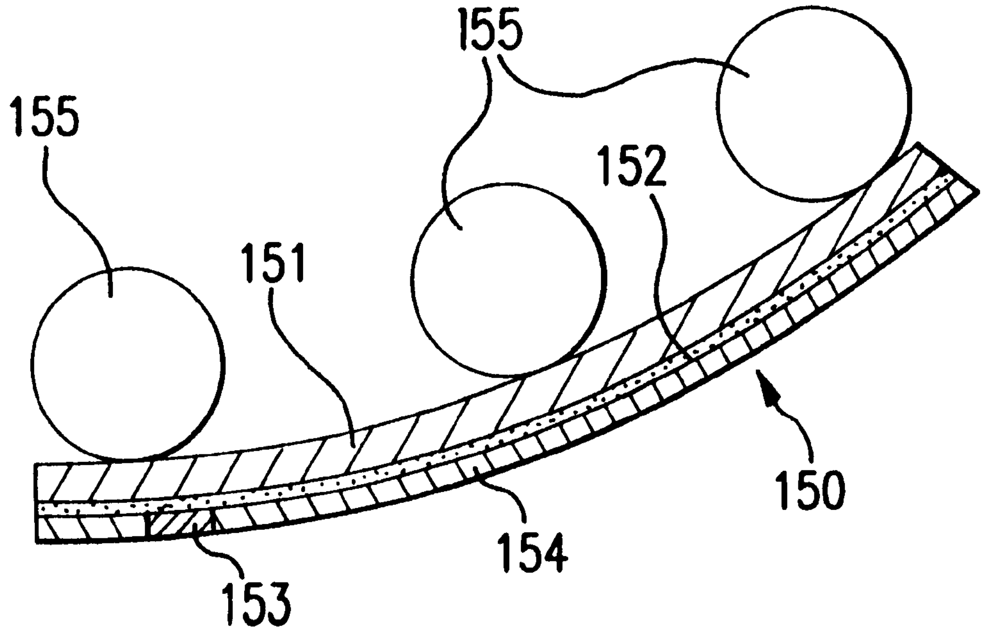
FIG. 39 is structural view of the preheating plate used in the thirteenth embodiment of the present invention.

In FIG. 38, the numeral 140 indicates a heating element for heating and accumulating a heat energy to the fusing film 131. In this embodiment, The heating element 140 comprises a substrate 141, a heater 142, an overcoating layer 143, a heat insulating layer 144 and a heat sensor 145 as indicated in FIG. 38. The heating element 140 has an longitudinal body along with the width of the fusing film 131. The body may have a low heat capacity.

The substrate 141 is a member having a good heat resistivity, a good electric insulation and a low heat capacitance. In this embodiment, the substrate 141 typically comprises aluminum oxide substrate. The heat resistive element 142 is an electrical resistive layer formed on the center portion of the contacting surface of the substrate 141 along with the longitudinal direction of the substrate 141. The heat resistive element typically comprises Ag—Pd alloy (Silver-Paradium Alloy) of 10 micrometer thickness. The overcoating layer 143 comprises a heat resistive glass material of 10 μm thickness and the heat insulating holder 144 is formed in order to insulate irradiating heat energy from the substrate 141. The heat sensor 145 is mounted directly on the upper surface of the substrate 141. The heater 140 is electrically coupled to the electric power supply circuit 146. The power supply circuit 146 control the temperature of the heating element 140 at an appropriate temperature. The electric power supply circuit is coupled to the gloss mode setting system 147. The Gloss mode setting system 147 has a switch system for switching the image forming mode between high gloss mode and Low gloss mode. In this case, if the high gloss mode is selected, the electric power is supplied to the heating element 140 and if the low gloss mode is selected, the electric power is not supplied to the heating element 140.

FIG. 38 indicates a pre-heating plate 150 used for the present embodiment. The pre-heating plate 150 is a heating member for applying a pre-heat energy to the toner image, the pre-heating plate comprises a metal substrate 151, a heating film 152, a heat sensor 153 and a heat insulating layer 154. The pre-heating plate has curvature as indicated in FIG. 38 along with the forwarding direction of the copy sheet 31. The front side portion of the plate along with the paper forwarding direction is connected to a nip portion between the pressure roller 132 and backup roller 133 for guiding the copy sheet 31 to the nip portion. Typically, the plate was made from bent steel plate having 2.0 mm thickness, 20 mm width and 220 mm length to form 20 mm curvature. The heating film 152 is attached on the bottom surface of the metal plate 151. The heating film 152 comprises patterned heating elements formed between two heat insulating, resistive films.

Three pairs of the transporting roller 155 are rotatably mounted on the above surface of the pre-heating plate 150, where the copy sheet 31 is contacted and corresponding to both side edges of the transporting copy sheet 31 along with transporting direction of the copy sheet 31. Preferably, the rollers have silicone rubber overcoating surface thereon. The rollers are mounted so that the rollers contact only to the recording paper within 10 mm, preferably 5 mm from the edge portion of the copy sheet 31 so as not to interfere any toner image on the recording paper. The electric power applying control circuit 156 is electrically connected to the pre-heating plate 150 in order to control the temperature of the pre-heating plate 150 at a pre-determined temperature in response to the detected temperature by the heat sensor 153. Preferably, the heating temperature of the preheating plate is more than melting point of the toner material.

At first, the copy sheet 31 carrying the unfixed toner image 32*a* is transported into the pre-heating portion D by paper transporting system (not shown). At the pre-heating portion D, the copy sheet 31 is primarily contacted to the surface of the pre-heating plate 150 at the both edge portions corresponding to perpendicular direction of the paper transporting direction by the transporting roller 155. Secondary, the copy sheet 31 contacts to the surface of the preheating plate 150 entirely due to the righting moment against to the bending force to the copy sheet 31. At this time, the copy sheet 31 is heated up to the temperature which is equivalent to the pre-heating temperature of the pre-heating plate 150 because the copy sheet is contacting to the pre-heating plate 150 for relatively long time. The unfixed toner image carrying by the copy sheet 31 is heated to the temperature which is equivalent to the temperature of the copy sheet 31 after the recording paper passes the pre-heating portion D. At this time, the temperature of the surface of the toner image and the temperature at the bottom surface of the toner contacting to the surface of the copy sheet become almost same temperature because the toner image is heated through the paper which has relatively high heat capacity materials.

The temperature of the heating plate 150 is previously set to 120° C. which is the temperature that the toner image is heated more than melting point of the toner material, preferably 10° C. more. After the copy sheet 31 pass through the pre-heating plate 150 at the pre-determined process speed, the toner image changes to melted state, however, the toner image keep its original shape. This is due to that toner particle is melted individually at this stage, however is not melted as a whole layer due to its high viscosity from $10^2$ to $10^4$ (Pa·s). Then the copy sheet is transported to the heat transferring portion B.

If the high-gloss mode is selected, the heater 140 is heated at the predetermined timing so as to accumulate a heat energy to the fusing film 131. In this embodiment, the temperature of the heater 140 is previously determined so that the fusing film 130 is heated more than melting point of the toner material.

At the heat transferring portion B, the fusing film 131 and the copy sheet 31 is pressed each other by the pressure roller 132 and the backup roller 133. At the beginning of the heat transferring portion B, the toner image having relatively high viscosity contacts to the surface of the fusing film 131. The toner image flows between the fusing film 131 and the copy sheet 31 and unifies its surface shape. The surface smoothness of the toner image is obtained according to the smoothness of the fusing film surface. At the ending of the heat transferring portion B, the toner image is cooled down to below the melting point of the toner material due to the heat conduction through the fusing film 131 and the pressure roll 132 or the copy sheet 31 and the backup roller 133.

If the low-gloss mode is selected, the heater 140 is not heated. At the beginning of the heat transferring portion B, the toner material is pressed and the heating energy accumulated on the toner material is absorbed by the fusing film 131. The toner image keep its original surface shape and is increasing stickiness to the copy sheet 31. At the end of the heat transferring portion B, the toner image is cooling down to below the melting point of the toner material due to the heat conduction through the fusing film 131 and the pressure roll 132 or the copy sheet 31 and the backup roller 133.

The copy sheet 31 is transported to the detaching portion C, which has a detaching roller 161 and the pressure roller 162, contacting to the fusing film 131 after the recording paper passes the heat transferring portion B. During the transporting between the heat transferring portion and the detaching portion, the copy sheet is cooled down naturally or forced to cool down by cooling means (not shown). Finally, the fusing film 131 and the recording paper 31 is separated due to its high curvature. In this embodiment, it is not necessary to cool down the rollers 132 and 133 because the recording paper is cooling down during the paper transporting path between the rollers 132, 133 and the rollers 161,162. In this embodiment, the gloss level of the surface of the toner image can be controlled between two levels which comprises high gloss level having from 80% to 90% gloss and low level gloss having from 5 to 10% by changing heating condition of the fusing film 131 by the heating element 140. The heating condition of the fusing film 131 may be controlled various method as well as the above mentioned two level control. The pre-heating level of the fusing film 131 may be controlled continuously according to the required gloss grade or fixed grade.

We claim:

1. A fixing device for fixing a toner image onto a copy sheet comprising:

a heating member having relatively low heat capacity;

a heat accumulating system that engages the heating member and temporarily accumulates heat energy, the heat accumulating system conveying the accumulated heat energy to the heating member to increase a temperature of the heating member;

a nip arrangement positioned downstream in a copy sheet traveling direction relative to the heat accumulating system, the nip arrangement nipping the toner image between the heating member and the copy sheet with an appropriate pressure contact so that the nip arrangement primarily transfers the heat energy from the heating member to the toner image on the copy sheet and subsequently cools the toner image between the heating member and the copy sheet; and a detaching system positioned downstream in the copy sheet traveling direction relative to the nip arrangement, the detaching system detaching the copy sheet from the heating member.

2. The fixing device as defined in claim 1, wherein the heat energy is sufficient to melt the toner image on the copy sheet at the nip arrangement.

3. The fixing device as defined in claim 1, further comprising a preheating system for heating the toner image on the copy sheet preliminarily.

4. The fixing device as defined in claim 3, wherein the nip arrangement comprises two soft rollers each having a soft-rubber surface thereon.

5. The fixing device as defined in claim 3, wherein the heat accumulating system and the pre-heating system together provide sufficient heat energy to melt the toner image on the copy sheet at the nip arrangement.

6. The fixing device as defined in claim 3, wherein the heat accumulating system includes a control system for controlling the heat energy so that the heat energy is set to be relatively low when the toner image has a single color and is set to be relatively high when the toner image has plural colors.

7. The fixing device as defined in claim 3, wherein the nip arrangement includes a control system for controlling the appropriate pressure so that the appropriate pressure is set to be relatively low when the toner image has a single color and is set to be relatively high when the toner image has plural colors.

8. The fixing device as defined in claim 3, wherein the pre-heating system includes a control system for controlling a pre-heating temperature so that the preheating temperature is set to be relatively low when the toner image has a single color and set to be relatively high when the toner image has plural colors.

9. The fixing device as defined in claim 3, wherein the detaching system includes a control system for controlling a temperature thereof.

10. The fixing device as defined in claim 3, wherein the toner image has plural colors.

11. The fixing device as defined in claim 1, wherein the nip arrangement comprises two nip portions including a first nip portion for transferring the heat energy from the heating member to the toner image on the copy sheet avoiding unnecessary contact-type heating loss, and a second nip portion for cooling the toner image on the copy sheet avoiding unnecessary contact-type heating provision.

12. The fixing device as defined in claim 1, wherein the nip arrangement transfers the heat energy from the heating member to the copy sheet so that a temperature of the toner image on the copy sheet exceeds a melting point thereof and reduces the temperature of the toner image thereafter to a temperature between the melting point of the toner image and a paper-detachable temperature without toner offset.

13. The fixing device as defined in claim 12, wherein the nip arrangement cools the temperature of the toner image on the copy sheet below the paper-detachable temperature without toner offset phenomenon.

14. The fixing device as defined in claim 13, wherein the detaching system detach the copy sheet from the heating member while the toner image on the copy sheet maintains a softened state.

15. The fixing device as defined in claim 14, wherein the temperature of the toner image on the copy sheet is drastically lowered after the nip arrangement transfers the heat energy to the copy sheet such that a cool down period is decreased.

16. The fixing device as defined in claim 1, wherein the heating member comprises at least one of a heat-resistive endless film and a heat-resistive thin wall cylinder.

17. The fixing device as defined in claim 1, wherein the heat accumulating member comprises a heating device for applying the heat energy to the heating member and a heat-insulating member for holding the heating member.

18. The fixing device as defined in claim 1, wherein the nip arrangement includes a heat sink.

19. A fixing method for fixing a toner image onto a copy sheet comprising the steps of:

accumulating heat energy temporarily at a heating member;

nipping the toner image between the heating member and the copy sheet with an appropriate pressure to primarily transfer heat energy from the heating member to the toner image, and to cool the toner image between the heating element and the copy sheet; and detaching the copy sheet from the heating element.

20. A printing system including a fusing system, wherein the fusing system comprises:

a heating member having relatively low heat capacity;

a heat accumulating system that temporarily accumulates heat energy and conveys the accumulated heat energy to the heating member;

a nip arrangement for nipping a toner image between the heating member and a copy sheet with an appropriate pressure contact so that the nip arrangement primarily transfers the heat energy from the heating member to the toner image and subsequently cools the toner image between the heating member and the copy sheet; and a detaching system for detaching the copy sheet from the heating member.

21. A fixing device for fixing a toner image onto a copy sheet comprising:

a heating member having relatively low heat capacity;

a heat accumulating system that temporarily accumulates a heat energy and conveys the accumulated heat energy to the heating member;

a nip arrangement for nipping the toner image between the heating member and the copy sheet with an appropriate pressure contact so that the nip arrangement primarily transfers the heat energy from the heating member to the toner image and subsequently cools the toner image; and a detaching system for detaching the copy sheet from the heating member.

* * * * *